(12) United States Patent
Iida

(10) Patent No.: US 6,278,678 B1
(45) Date of Patent: Aug. 21, 2001

(54) EDITING APPARATUS, EDITING METHOD, AND RECORDING MEDIUM

(75) Inventor: Kenichi Iida, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/500,521

(22) Filed: Feb. 9, 2000

(30) Foreign Application Priority Data

Feb. 12, 1999 (JP) .................................................. 11-035000

(51) Int. Cl.7 ......................................................... G11B 7/00
(52) U.S. Cl. ........................ 369/83; 369/47.13; 369/53.41
(58) Field of Search .............................. 369/83, 84, 47.1, 369/47.11, 47.12, 47.13, 47.15, 47.16, 53.1, 53.2, 53.22, 53.31, 53.37, 53.41, 59.1, 59.25

(56) References Cited

U.S. PATENT DOCUMENTS 5,694,387 * 12/1997 Gotoh et al. .
5,737,639 * 4/1998 Ohmori .

* cited by examiner

*Primary Examiner*—Muhammad Edun
(74) *Attorney, Agent, or Firm*—Jay H. Maioli

(57) ABSTRACT

An editing apparatus divides a data file including main data and management data into a first file and a second before and after a divide position. The divide position is first determined. Then, a recording data block containing the divide position is copied into a data space of the first file. The management information of the first file is edited. Then, the management information for the second file is created and edited.

29 Claims, 29 Drawing Sheets

FIG. 4

| BIT | DEFINITION |
|---|---|
| 7 | RESERVED |
| 6 | RESERVED |
| 5 | ACCESS ENABLE (1: FREE, 0: READ PROTECTED) |
| 4 | COPY PROTECT (1: OK, 0: NG) |
| 3 | TRANSLATION TABLE FLAG (1: INVALID, 0: TABLE BLOCK) * ONLY FINAL SEGMENT IS VALID |
| 2 | SYSTEM FLAG (1: USER BLOCK, 0: BOOT BLOCK) |
| 1 | RESERVED |
| 0 | RESERVED |

FIG. 6

| PHYSICAL ADDRESS (2 BYTES) | | LOGICAL ADDRESS (2 BYTES) | |
|---|---|---|---|
| 0x00 | 0x03 | ← LOGICAL ADDRESS | 0x0000 |
| 0x00 | 0x04 | ← LOGICAL ADDRESS | 0x0001 |
| 0x00 | 0x04 | ← LOGICAL ADDRESS | 0x0002 |
| 0x00 | 0x05 | ← LOGICAL ADDRESS | 0x0003 |
| 0x01 | 0xA8 | ← LOGICAL ADDRESS | 0x0004 |
| 0x00 | 0x06 | ← LOGICAL ADDRESS | 0x0005 |

FIG. 8

| A | B | C | D | E |
|---|---|---|---|---|
| FLASH MEMORY CAPACITY | NUMBER OF BLOCKS | CAPACITY PER BLOCK | CAPACITY PER PAGE | LOGICAL/PHYSICAL ADDRESS TRANSLATION TABLE SIZE |
| 4MB | 512 (1 SEGMENT) | 8KB (16 PAGES) | (512 + 16)B | 1KB (2 PAGES) |
| 8MB | 1024 (2 SEGMENTS) | 8KB (16 PAGES) | (512 + 16)B | 2KB (4 PAGES) |
| 16MB | 2048 (4 SEGMENTS) | 8KB (16 PAGES) | (512 + 16)B | 4KB (8 PAGES) |
| 16MB | 1024 (2 SEGMENTS) | 16KB (32 PAGES) | (512 + 16)B | 2KB (4 PAGES) |
| 32MB | 2048 (4 SEGMENTS) | 16KB (32 PAGES) | (512 + 16)B | 4KB (8 PAGES) |
| 64MB | 4096 (8 SEGMENTS) | 16KB (32 PAGES) | (512 + 16)B | 8KB (16 PAGES) |
| 128MB | 8192 (16 SEGMENTS) | 16KB (32 PAGES) | (512 + 16)B | 16KB (32 PAGES) |

FIG. 12

| FILE NAME (8 BYTES) | EXTENSION (3 BYTES) | ATTRIBUTE (1 BYTE) | RESERVED (10 BYTES) | TIME (2 BYTES) | DATE (2 BYTES) | LEADING CLUSTER (2 BYTES) | SIZE (4 BYTES) |

FIG. 15

| offset | 0 1 2 3 4 5 6 7 8 9 A B C D E F |
|---|---|
| 0x0000<br>0x0010 | HEADER (32 BYTES) |
| 0x0020<br>0x0030<br>0x0040<br>0x0050 | FOLDER ENTRY (64 BYTES) |
| 0x0060<br>0x0070 | MESSAGE ENTRY (32 BYTES) |
| 0x0080<br>0x0090 | MESSAGE ENTRY (32 BYTES) |
| 0x00A0<br>0x00B0 | MESSAGE ENTRY (32 BYTES) |
| ⋮ | ⋮ |
| | MESSAGE ENTRY (32 BYTES) |
| | FOLDER ENTRY (64 BYTES) |
| | MESSAGE ENTRY (32 BYTES) |
| | MESSAGE ENTRY (32 BYTES) |
| | MESSAGE ENTRY (32 BYTES) |
| | ⋮ |
| | MESSAGE ENTRY (32 BYTES) |
| | FOLDER ENTRY (64 BYTES) |
| | MESSAGE ENTRY (32 BYTES) |
| | MESSAGE ENTRY (32 BYTES) |
| | MESSAGE ENTRY (32 BYTES) |
| | ⋮ |

FIG. 16

|  | 0 1 2 3 | 4 5 | 6 7 | 8 9 A B | C D | E F |
|---|---|---|---|---|---|---|
| 0x0000 | MSG-ID | FMT-VER | MCode | YMDHMSW | | |
| 0x0010 | FILE-NO | FSIZE | MSIZE | OFFSET | CCODE | REV | (R) |

FIG. 17

|  | 0 1 | 2 3 | 4 5 6 7 8 9 A B C D E F |
|---|---|---|---|
| 0x0000 | FLD-ID | MCode | FLD-NAME |
| 0x0010 | C-CODE | (R) | |
| 0x0020 | | | DISP-NAME |
| 0x0030 | | | |

FIG. 18

|  | 0 | 1 | 2 | 3 4 5 6 7 | 8 9 A B C D | E F |
|---|---|---|---|---|---|---|
| 0x0000 | MID | PRI | AL-M | AL-DATE | (R) | |
| 0x0010 | FILE-NAME | | | | REC-DATE | (R) |

FIG. 20

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | FILE-ID ||||||||  SIZE-FMT |||| FMT-VER || (R) ||
| 0x0010 | C-NAME ||||||||||||||||
| 0x0020 | S-NAME ||||||||||||||||
| 0x0030 | SET-VER |||| (R) |||| DATE-TIME |||||| FMT-ID || CHAN ||
| 0x0040 | SAMP |||| BYTE |||| ALIGN |||| BIT || EXT || (R) |

| ID | | RESERVED | SIZE |
|---|---|---|---|
| FORMAT FRAME | (0x01) | 0x000000 | 0x00000050 |
| TOC FRAME | (0x02) | 0x000000 | 0x00000020 |
| SPACE FRAME | (0x03) | 0x000000 | 0x00000190 |
| DATA FRAME | (0x04) | 0x000000 | 0x00005E00 |

ONE CLUSTER = 8KB
(ONE BLOCK)

|  | ID | RESERVED | SIZE |
|---|---|---|---|
| FORMAT FRAME | (0x01) | 0x000000 | 0x00000050 |
| TOC FRAME | (0x02) | 0x000000 | 0x00000030 |
| SPACE FRAME | (0x03) | 0x000000 | 0x00000180 |
| DATA FRAME | (0x04) | 0x000000 | 0x00004E00 |
| SPACE FRAME | (0x03) | 0x000000 | 0x00000100 |
| DATA FRAME | (0x04) | 0x000000 | 0x00000F00 |

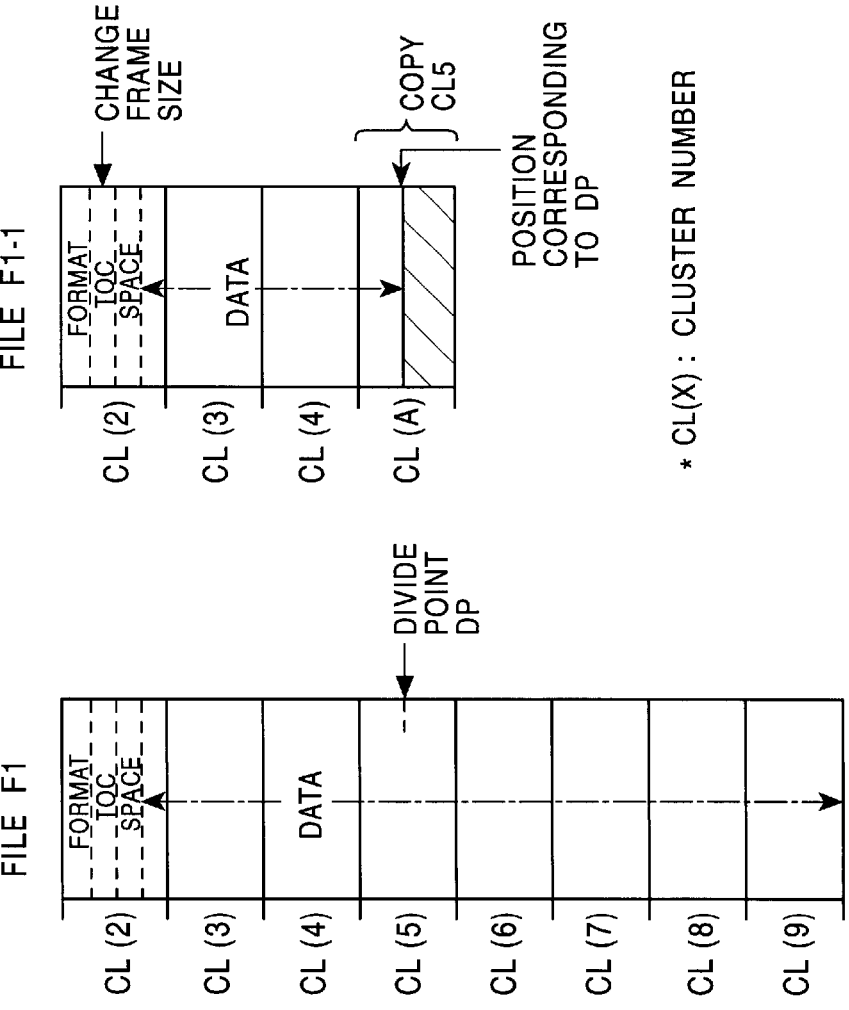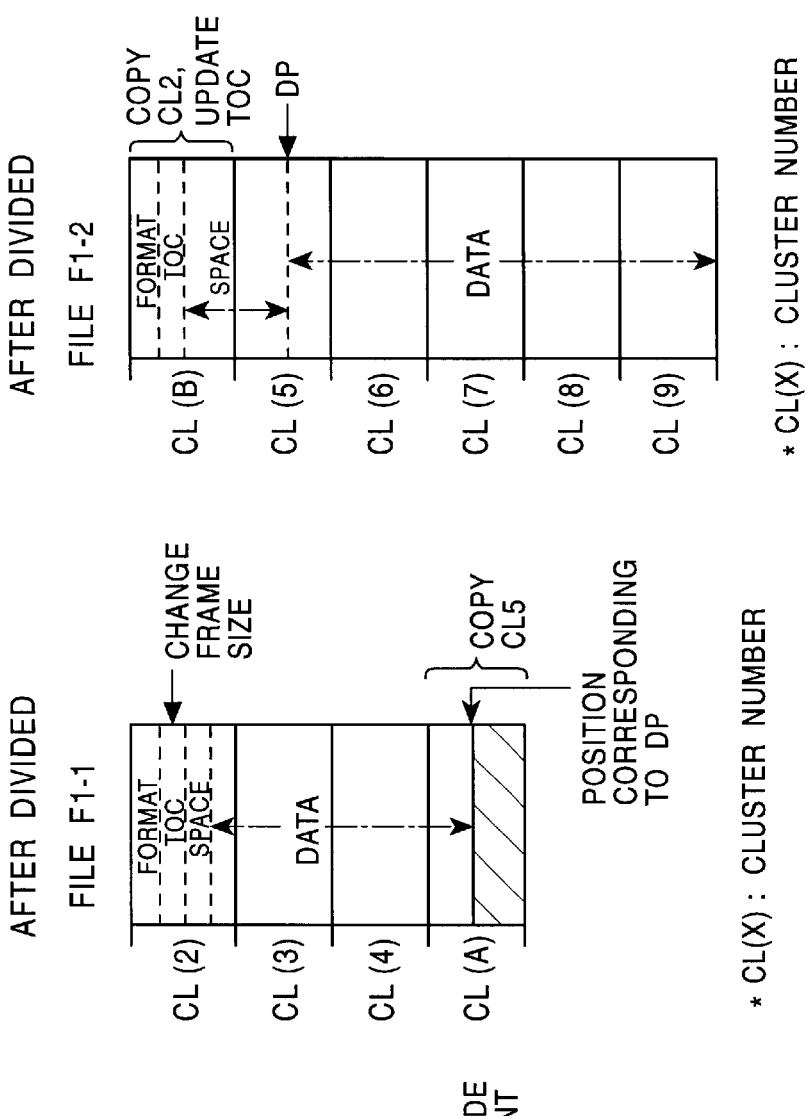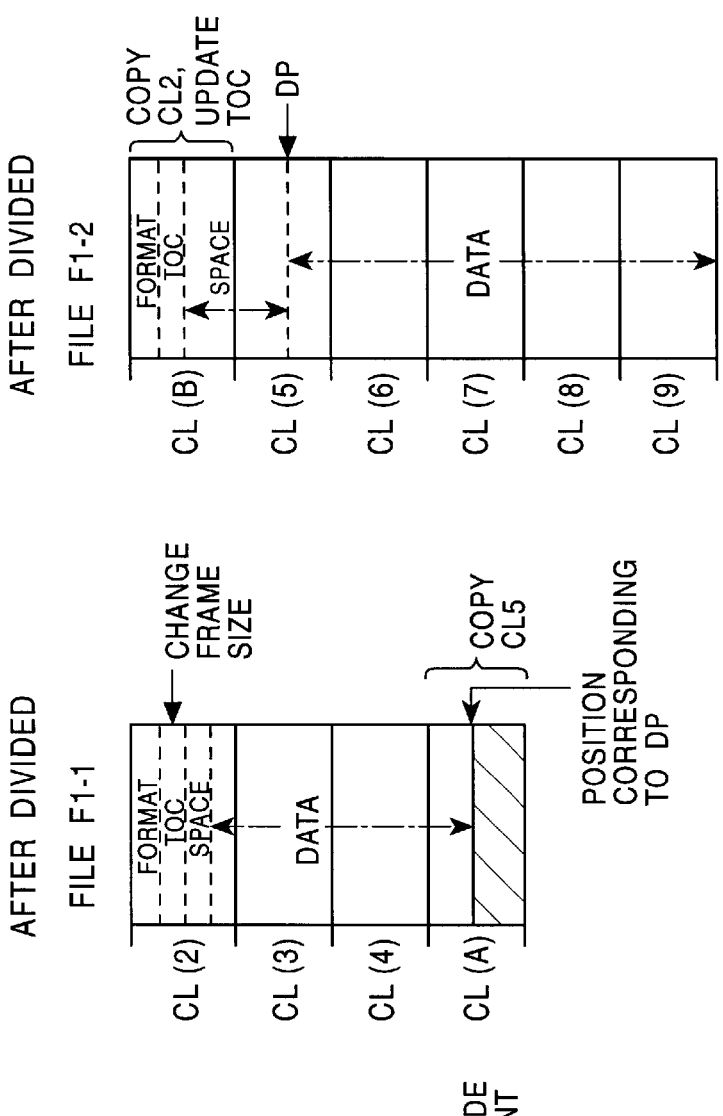

FIG. 27

FAT (BEFORE DIVIDED)

| (0) | (1) | (2)<br>003 | (3)<br>004 | (4)<br>005 | (5)<br>006 | (6)<br>007 | (7)<br>008 |
|---|---|---|---|---|---|---|---|
| (8)<br>009 | (9)<br>FFF | (A)<br>000 | (B)<br>000 | (C)<br>000 | (D)<br>000 | (E)<br>000 | (F)<br>000 |
| (10)<br>000 | (11)<br>000 | (12)<br>000 | (13)<br>000 | (14)<br>000 | (15)<br>000 | (16)<br>000 | (17)<br>000 |
| (18)<br>000 | (19)<br>000 | (1A)<br>000 | (1B)<br>000 | (1C)<br>000 | (1D)<br>000 | (1E)<br>000 | (1F)<br>000 |
| ⋮ | ⋮ | ⋮ | ⋮ | ⋮ | ⋮ | ⋮ | ⋮ |
| (CLmax-7)<br>000 | (CLmax-6)<br>000 | (CLmax-5)<br>000 | (CLmax-4)<br>000 | (CLmax-3)<br>000 | (CLmax-2)<br>000 | (CLmax-1)<br>000 | (CLmax)<br>000 |

\* CORRESPONDING CLUSTER NUMBER IN ( )
HEXADECIMAL NOTATION

FIG. 28

FAT (AFTER DIVIDED)

| (0) | (1) | (2) 003 | (3) 004 | (4) 00A | (5) 006 | (6) 007 | (7) 008 |
|---|---|---|---|---|---|---|---|
| (8) 009 | (9) FFF | (A) FFF | (B) 005 | (C) 000 | (D) 000 | (E) 000 | (F) 000 |
| (10) 000 | (11) 000 | (12) 000 | (13) 000 | (14) 000 | (15) 000 | (16) 000 | (17) 000 |
| (18) 000 | (19) 000 | (1A) 000 | (1B) 000 | (1C) 000 | (1D) 000 | (1E) 000 | (1F) 000 |
| ⋮ | ⋮ | ⋮ | ⋮ | ⋮ | ⋮ | ⋮ | ⋮ |
| (CLmax-7) 000 | (CLmax-6) 000 | (CLmax-5) 000 | (CLmax-4) 000 | (CLmax-3) 000 | (CLmax-2) 000 | (CLmax-1) 000 | (CLmax) 000 |

\* CORRESPONDING CLUSTER NUMBER IN ( ) HEXADECIMAL NOTATION

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | ID || (R) ||| SIZE |||| ID || (R) ||| SIZE ||||
| 0x0010 | ID || (R) ||| SIZE |||| ID || (R) ||| SIZE ||||
| 0x0020 | ID || (R) ||| SIZE |||| ALL 0 x 00 |||||||

EDITING APPARATUS, EDITING METHOD, AND RECORDING MEDIUM

BACKGROUND OF THE INVENTION

1. Field of the Invention

The present invention generally relates to editing apparatuses and editing methods. More particularly, the invention relates to an editing apparatus for dividing a data file including main data formed by interconnecting one or a plurality of fixed-length recording data blocks and management data which manages recording positions and invalid data locations which is not to be reproduced. The invention also pertains to an editing method for use in the above type of editing apparatus and to a recording medium.

2. Description of the Related Art

The following type of storage system is being developed. A small storage medium having a built-in solid-state storage device, such as a flash memory, is formed and is loaded into a drive system specifically used for the above type of storage medium. Alternatively, the above-described storage medium is loaded into a drive system which is integrated into an audio/video machine or an information apparatus. Thus, computer data, image data, and sound data can be stored in the storage medium.

In the aforementioned storage system using a solid-state storage device, an editing operation is required on a file stored in the storage system. There is a further demand for an efficient editing operation, such as moving, copying, and overwriting of data, which is required for editing a file in the storage medium, is minimized, and the processing time and the power consumption required for an editing operation is reduced to a minimal level.

SUMMARY OF THE INVENTION

Accordingly, it is an object of the present invention to provide an editing apparatus for performing an editing operation more efficiently.

To achieve the above object, according to one aspect of the present invention, there is provided an editing apparatus for dividing a data file including main data and first management data added to the main data, the main data being formed by interconnecting one or a plurality of fixed-length recording data blocks, the first management data for managing a recording position of the main data and a position of invalid data which is not to be reproduced. The editing apparatus includes an operation unit for specifying a divide position at which a predetermined fixed-length recording data block including the main data and for dividing the main data into first and second data files in accordance with the divide position. An editing unit edits the first management data in order to make a first part of the predetermined fixed-length recording data block including the main data invalid. A generating unit generates second management data in order or make a second part of the predetermined fixed-length recording data block including the main data invalid, and adds the second management data to the second data file.

According to another aspect of the present invention, there is provided an editing method for dividing a data file including main data and first management data related to the main data, the main data being formed by interconnecting one or a plurality of fixed-length recording data blocks, the first management data for managing a recording position of the main data and a position of invalid data which is not to be reproduced. The editing method includes: a specifying step of specifying a divide position at a predetermined fixed-length recording data block including the main data and for dividing the main data into first and second data files in accordance with the divide position; an editing step of editing the first management data in order to make a first part of the predetermined fixed-length recording data block including the main data invalid; and a generating step of generating second management data in order to make a second part of the predetermined fixed-length recording data block including the main data invalid, and for adding the second management data to the second data file.

According to still another aspect of the present invention, there is provided a recording medium for managing at least one file and for reading or writing the file in units of data lengths. The recording medium includes a data recording area for recording at least one data file which is formed of at least one item of main data, at least one item of space data for reserving a recording area, and first management data for managing recording positions of the main data and the space data on a storage medium. A management-data recording area records second management data which manages the data file recorded in the data recording area.

BRIEF DESCRIPTION OF THE DRAWINGS

FIG. 4 illustrates the contents of the management flags of the stick-type memory according to an embodiment of the present invention;

FIG. 6 illustrates the management format of a logical-to-physical (logical/physical) address translation table used in an embodiment of the present invention;

FIG. 8 illustrates the relationships between the flash memory capacity, the number of blocks, the capacity per block, the capacity per page, and the size of the logical/physical address translation table of the stick-type memory of an embodiment of the present invention;

FIG. 12 illustrates the directory structure;

FIG. 15 illustrates a message list file according to an embodiment of the present invention;

FIG. 16 illustrates the header of the message list file according to an embodiment of the present invention;

FIG. 17 illustrates the folder entry of the message list file according to an embodiment of the present invention;

FIG. 18 illustrates the message entry of the message list file according to an embodiment of the present invention;

FIG. 20 illustrates the format frame of the message data file according to an embodiment of the present invention;

FIG. 26A illustrates a file F1 before a dividing operation is performed;

FIG. 26B illustrates a first file F1-1 after a dividing operation is performed;

FIG. 26C illustrates a second file F1-2 after a dividing operation is performed;

FIG. 27 illustrates the FAT before a dividing operation is performed;

FIG. 28 illustrates the FAT after a dividing operation is performed;

DESCRIPTION OF THE PREFERRED EMBODIMENTS

An embodiment of the present invention is described below with reference to the drawings. In this embodiment, a stick-type memory having a stick-like outer configuration serves as the recording medium of the present invention. An editing apparatus of the present invention is described in the context of a drive system for recording/reproducing a file on/from the stick-type memory, and an editing method of the present invention is implemented by an editing method employed in the above type of drive system.

1 Outer Configuration of Stick-type Memory

Reference is first made to FIGS. 1A through 1D to describe the outer configuration of a stick-type memory 1, which serves as the recording medium of the present invention.

The stick-type memory 1 contains, for example, a memory device having a predetermined capacity, within a stick-type casing, such as the one shown in FIGS. 1A through 1D. In this embodiment, a flash memory is used as the memory device.

Figure 1A:
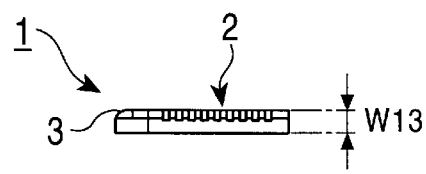
FIG. 1A is a front view illustrating the outer configuration of a stick-type memory according to an embodiment of the present invention.
Figure 1B:
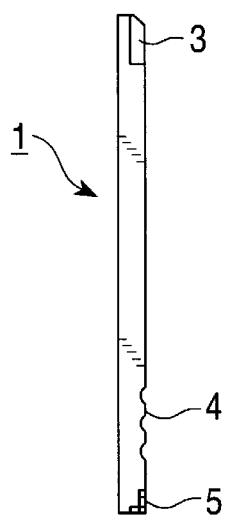
FIG. 1B is a side view illustrating the outer configuration of the stick-type memory according to an embodiment of the present invention.
Figure 1C:
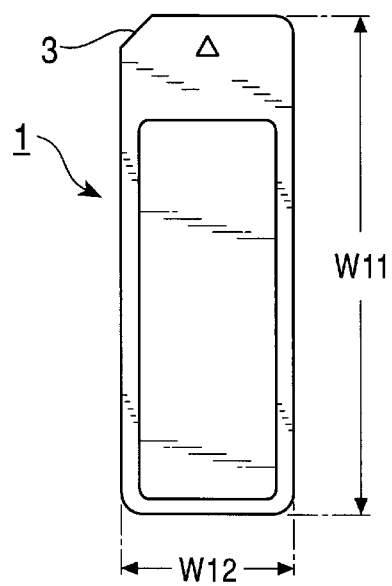
FIG. 1C is a plan view illustrating the outer configuration of the stick-type memory according to an embodiment of the present invention.

The casing shown in FIGS. 1A through 1D is formed of, for example, a plastic mold, and has dimensions of 60 mm (W11), 20 mm (W12), and 2.8 mm (W13), as illustrated in FIGS. 1A and 1C.

Figure 1D:
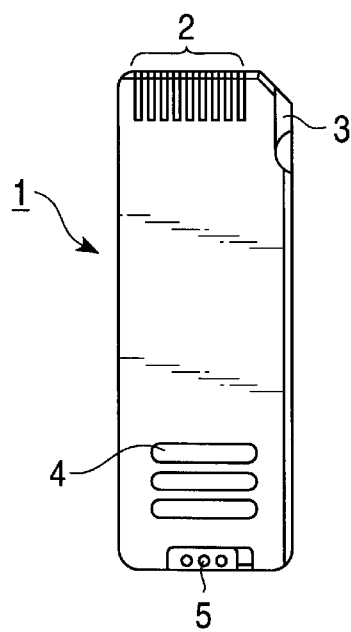
FIG. 1D is a bottom view illustrating the outer configuration of the stick-type memory according to an embodiment of the present invention.

A terminal 2 having nine electrodes is formed from the lower portion of the front side to the bottom surface of the casing, as shown in FIGS. 1A and 1D. The reading/writing operation is performed on the built-in memory device through this terminal 2.

A notch 3 is formed at the upper left portion of the casing as viewed from FIG. 1C. By virtue of the provision of the notch 3, the stick-type memory 1 can be prevented from being erroneously inserted into, for example, a loading/unloading mechanism of the drive system. Slippage-preventing indentations 4 are formed on the bottom surface of the casing so as to improve the ease of operation. A sliding switch 5 for preventing data from being inadvertently erased is also provided on the bottom surface.

2 Format of Stick-type Memory 2.1 Memory file system process hierarchy

The system format of the stick-type memory 1, which serves as the recording medium, is as follows.

Figure 2:
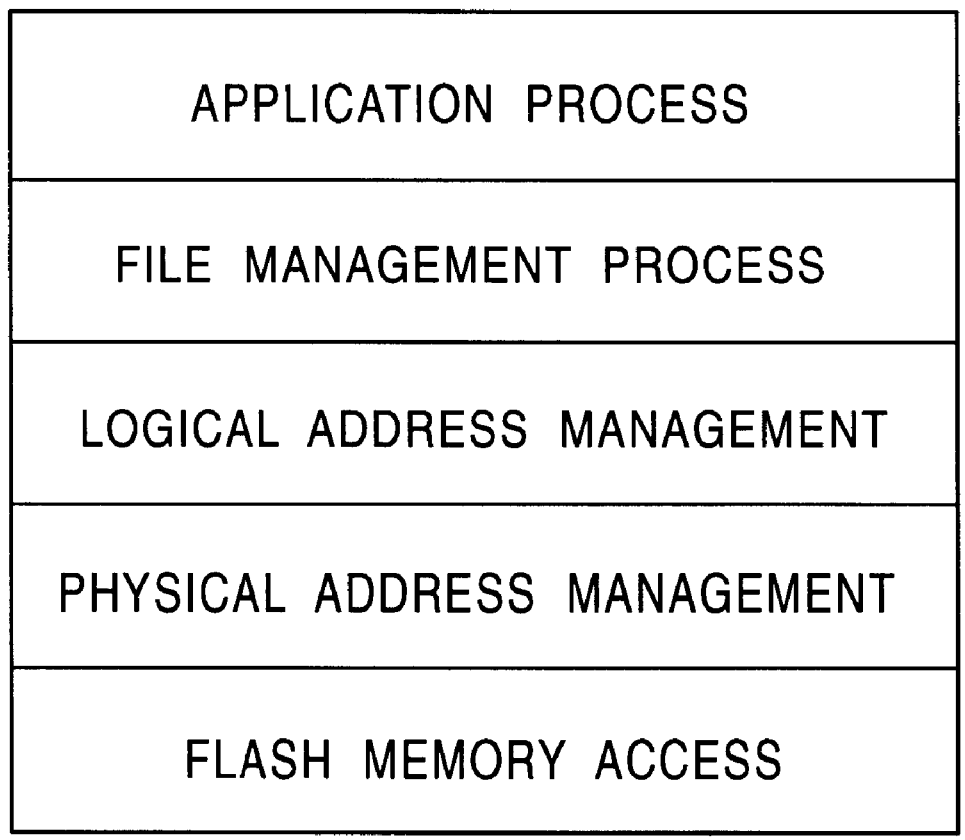
FIG. 2 illustrates a file system process hierarchy used in an embodiment of the present invention.

FIG. 2 illustrates the file system process hierarchy of the stick-type memory 1. The file system process hierarchy is formed of, as shown in FIG. 2, an application process layer, a file management process layer, a logical address management layer, a physical address management layer, and a flash memory access in descending order. In this hierarchy, the file management process layer serves as a so-called "file allocation table (FAT)". FIG. 2 shows that the file system in this embodiment introduces the concept of the logical address and the physical address, which will be described in detail later.

2.2 Physical data structure

Figure 3:
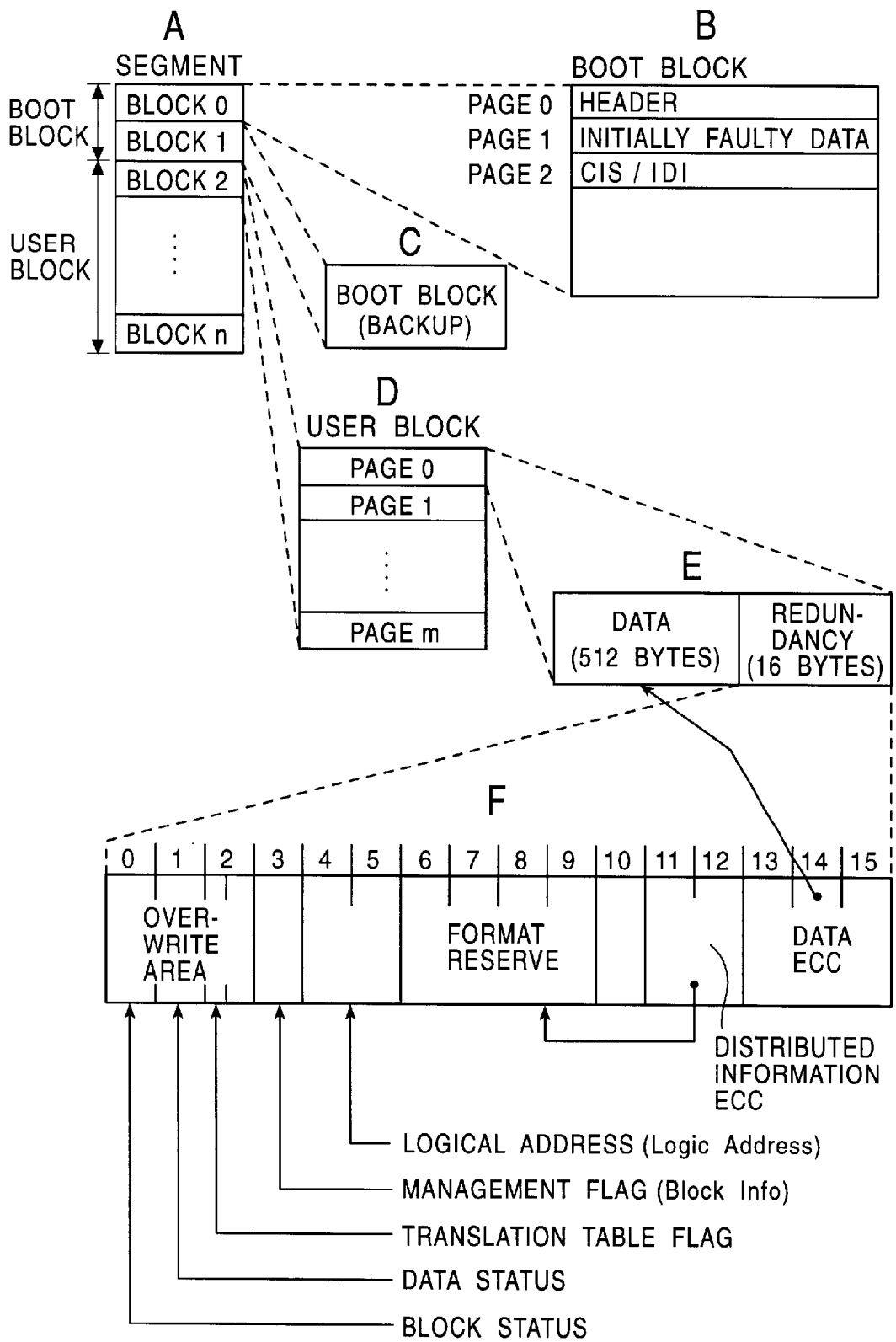
FIG. 3 illustrates the physical data structure of the stick-type memory according to an embodiment of the present invention.

FIG. 3 illustrates the physical data structure of the flash memory, which serves as the memory device within the stick-type memory 1.

The storage areas of the flash memory are primarily determined in data units, which are referred to as "segments", having a fixed length. Each segment is defined to have a size of four megabytes (MB) or eight MB, and the number of segments within a single flash memory varies according to the capacity of the flash memory.

Each segment is divided into fixed-length data units, which are referred to as "blocks", having a length of 8 kilobytes (KB) or 16 KB, as indicated in A of FIG. 3. Basically, one segment is divided into 512 blocks, and thus, the number of blocks n indicated in A of FIG. 3 is 511. However, since a predetermined number of blocks are allowed for write-disabled defective areas in the flash memory, the practical number of write-enabled blocks may be smaller than 511.

Among blocks 0 through n arranged as indicated by A of FIG. 3, the two leading blocks, i.e., block 0 and block 1, are referred to as "boot blocks". In practice, however, two blocks from the start of valid blocks are defined as boot blocks, and block 0 and block 1 are not always the boot blocks. The remaining blocks are used as user blocks for storing user data.

Each block is divided into pages 0 through m, as indicated in D of FIG. 3, and each page is formed of a 512-byte data area and a 16-byte redundancy area, as indicated in E of FIG. 3, therefore having a total capacity of 528 bytes, which is a fixed length. The structure of the redundancy unit will be described in detail with reference to F of FIG. 3. The number of pages within each block is 16 when the block capacity is 8 KB, and is 32 when the block capacity is 16 KB.

The same page structure indicated in D and E of FIG. 3 is used for the boot blocks and user blocks. In the flash memory, data reading/writing is performed in units of pages, while data erasing is performed in units of blocks. However, since data is only written into free pages from which data is erased, data overwriting/writing is, in practice, performed in units of blocks.

In the leading boot block (block 0), as indicated in B of FIG. 3, a header is stored in page 0, address information indicating the location of initially faulty data is stored in page 1, and CIS/IDI information is stored in page 2. The second boot block (block 1) is used as a backup boot block, as indicated in C of FIG. 3.

The structure of the redundancy area indicated in E of FIG. 3 is as indicated in F of FIG. 3. In the redundancy area, the first three bytes, i.e., byte number 0 through byte number 2, are used as an overwrite area which is overwritable according to the updating of the data content of the data area. Within the overwrite area, the block status is stored in byte number 0, block flag data is stored in byte number 1 as the data status, and the page data status is stored in a predetermined upper bit of byte number 2 as a translation table flag.

In principle, byte number 3 through byte number 15 store fixed data according to the content of the current page, i.e., they store information that cannot be overwritten. Management flags (Block Info) are stored in byte number 3, and a logical address (Logic Address), which will be discussed later, is stored in the subsequent two bytes, i.e., byte numbers 4 and 5. The subsequent five bytes, i.e., byte number 6 through byte number 10, are used as a format reserve area, and the subsequent two bytes, i.e., byte number 11 and byte number 12, store distributed information error correction code (ECC) for correcting errors of the format reserve area. The remaining three bytes, i.e., byte number 13 through byte number 15, store data ECC for correcting errors of the data stored in the data area indicated in E of FIG. 3.

The contents of the management flags stored in byte number 3 of the redundancy area indicated in F of FIG. 3 are defined in bit number 7 through bit number 0, as shown in FIG. 4.

Bit numbers 7, 6, 1, and 0 are reserved (undefined) areas. Bit number 5 stores a flag indicating whether access to a current block is valid ('1', free) or invalid ('0', read protected). Bit number 4 stores a flag indicating whether copy protect is effected ('1', OK) or ('0', No Good (NG)).

Bit number 3 stores a translation table flag, which is an identifier for indicating whether the current block stores a logical-to-physical (logical/physical) address translation table, which will be described in detail later. If the value of bit number 3 is '0', the current block is found to store a logical/physical address translation table. If the value of bit number 3 is '1', it is found that the current block does not store a logical/physical address translation table.

Bit number 2 stores a system flag. If the system flag is '1', the current block is determined to be a user block. If the system flag is '0', the current block is found to be a boot block.

The relationship of the segments and the blocks to the capacity of the flash memory is discussed below with reference to FIG. 8. The flash memory capacity of the stick-type memory 1 is defined as any one of 4 MB, 8 MB, 16 MB, 32 MB, 64 MB, and 128 MB.

When the flash memory has the smallest capacity of 4 MB, the capacity of one block is defined as 8 KB, and the number of blocks is 512, namely, the capacity of the flash memory, i.e., 4 MB, is equivalent to the capacity of one segment. When the capacity of the flash memory is 8 MB, the capacity of one block is defined as 8 KB, and the number of blocks in two segments is 1024 (512 for each segment). As stated above, when one block has 8 KB, the number of pages in one block is 16.

Concerning a flash memory having a capacity of 16 MB, the capacity of one block may be either 8 KB or 16 KB. Accordingly, the flash memory is divided into two types, i.e., one type having 4 segments and 2048 blocks (one block is 8 KB), and the other type having 2 segments and 1024 blocks (one block is 16 KB). When one block is 16 KB, the number of pages in one block is 32.

With respect to a flash memory having a capacity of 32 MB, 64 MB, or 128 MB, the capacity of one block is defined as 16 KB only. Accordingly, the number of segments/blocks of the flash memories having a capacity of 32 MB, 64 MB, and 128 MB, is 4/2048, 8/4096, and 16/8192, respectively.

2.3 Concept of physical address and logical address

In view of the above-described physical data structure of the flash memory, the concept of the physical address and the logical address in the file system of this embodiment is described below in the context of the data overwriting operation shown in A and B of FIG. 5.

Each block is provided with a physical address. The physical address is determined according to the order of the physical arrangement of the blocks in the flash memory, and the relationship between a block and the corresponding physical address is unchanged. In the example shown in A of FIG. 5, four blocks are provided with physical addresses, such as 105, 106, 107, and 108, from the top. The actual physical addresses are each represented by two bytes.

Figure 5:
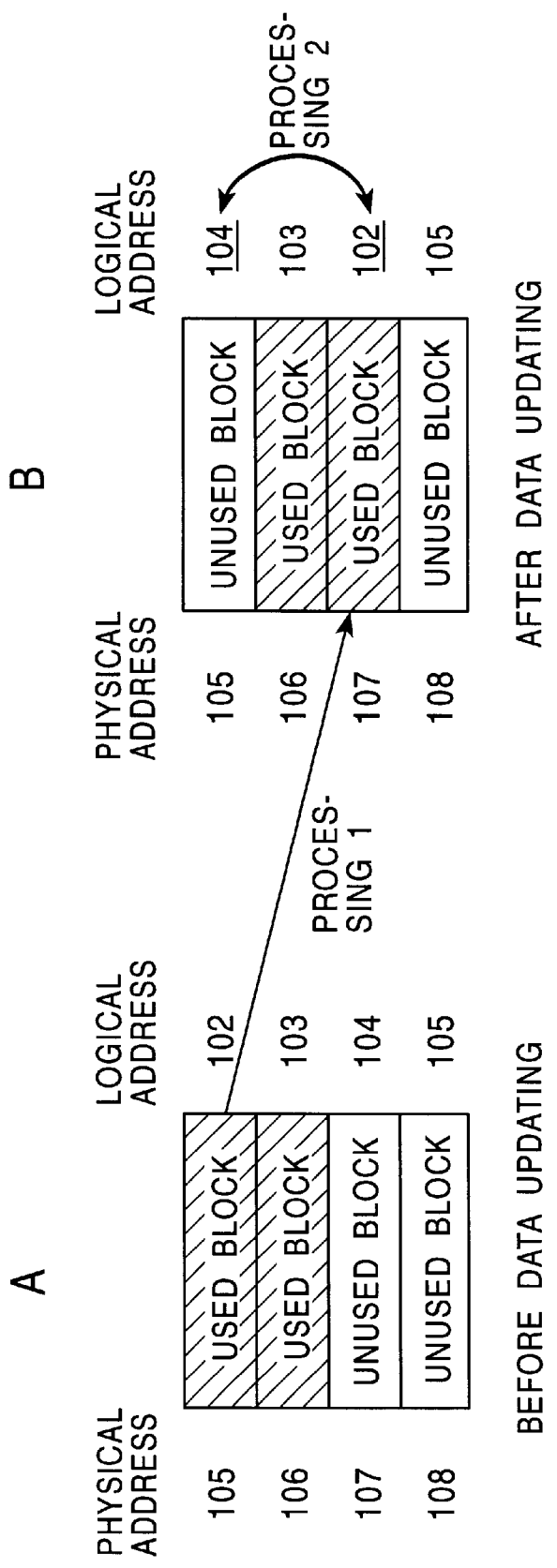
FIG. 5 illustrates the concept of the physical address and the logical address before and after data updating of the stick-type memory according to an embodiment of the present invention.

It is now assumed, as indicated in A of FIG. 5, that the blocks provided with physical addresses 105 and 106 are recorded areas, in which data is stored, and the blocks provided with physical addresses 107 and 108 are unrecorded areas, from which data has been erased.

In contrast, the logical address is an address assigned to data written into a block, and is used by the FAT file system, which will be discussed later.

In the example indicated in A of FIG. 5, four blocks are provided with logical addresses, such as 102, 103, 104, and 105, from the top. The logical address, as well as the physical address, is represented by two bytes.

It is now assumed that the data stored in physical address 105, as shown in A of FIG. 5, is to be overwritten or partially erased. In performing this type of operation, in the file system of the flash memory, updated data is written into an unused block rather than being written into the same block (in this case, the block with physical address 105). That is, the data stored at physical address 105 is erased, as illustrated in B of FIG. 5, and the updated data is written into the block with physical address 107, which was an unused block, as indicated by processing 1.

Then, as indicated by processing 2, logical address 102 corresponded to physical address 105 before data updating, as shown in A of FIG. 5, is reallocated so that it corresponds to physical address 107, which is now provided for the block into which the updated data has been written. Accordingly, logical address 104 associated with physical address 107 before data updating is reallocated so that it is associated with physical address 105.

That is, the physical address is an address uniquely assigned to the corresponding block, while the logical address is an address uniquely assigned to data which has been written into a block.

By swapping blocks as described above, it is possible to avoid intensive access to the same storage area (block), thereby prolonging the life of the flash memory, which has a limited number of accesses (overwrites).

By reallocating the logical address, as represented by processing 2, even though blocks are swapped and relocated after data updating, the FAT identifies the same address, thereby making it possible to correctly access the data thereafter.

To simplify the management of the data updating on the logical/physical address translation table, which will be discussed in detail below, block swapping is restricted to within one segment, in other words, blocks are prohibited from being swapped between segments.

2.4 Logical/physical address translation table

According to the description with reference to FIG. 5, the correlation between the physical address and the logical address is changed by performing block swapping. Accordingly, to access the flash memory for reading/writing data from/into the flash memory, it is necessary to refer to the logical/physical address translation table indicating the correlation between the physical address and the logical address. More specifically, the FAT refers to the logical/physical address translation table so as to specify the physical address corresponding to the logical address designated by the FAT, thereby making it possible to access the block represented by the specified physical address. In other words, without the logical/physical address translation table, it is impossible to access the flash memory by the FAT.

Conventionally, when the stick-type memory 1 is loaded into, for example, a drive system, the microcomputer of the drive system checks the storage content of the stick-type memory 1 so as to construct the logical/physical address translation table and further stores the constructed table in the RAM of the drive system. That is, information of the logical/physical address translation table is not stored in the stick-type memory 1.

In contrast, according to this embodiment, the logical/physical address translation table is stored in the stick-type memory 1.

FIG. 6 illustrates the concept of the format of the constructed logical/physical address translation table to be stored in the stick-type memory 1 of this embodiment. In this embodiment, table information in which two-byte physical addresses are stored in accordance with the associated logical addresses which are arranged in ascending order is constructed as the logical/physical address translation table.

As stated above, both the physical addresses and the logical addresses are represented by two bytes. This is based on the fact that the same number of bits as those to cover all the 8192 blocks for a flash memory having a maximum capacity of 128 MB is required.

Thus, the physical addresses and the logical addresses shown in FIG. 6 by way of example are represented by two bytes. In this example, the physical addresses and the logical addresses are indicated in hexadecimal, namely, the values after 0x are hexadecimal. The same notation applies to the following description in the specification. For simple representation, however, 0x is omitted in some figures.

Figure 7:
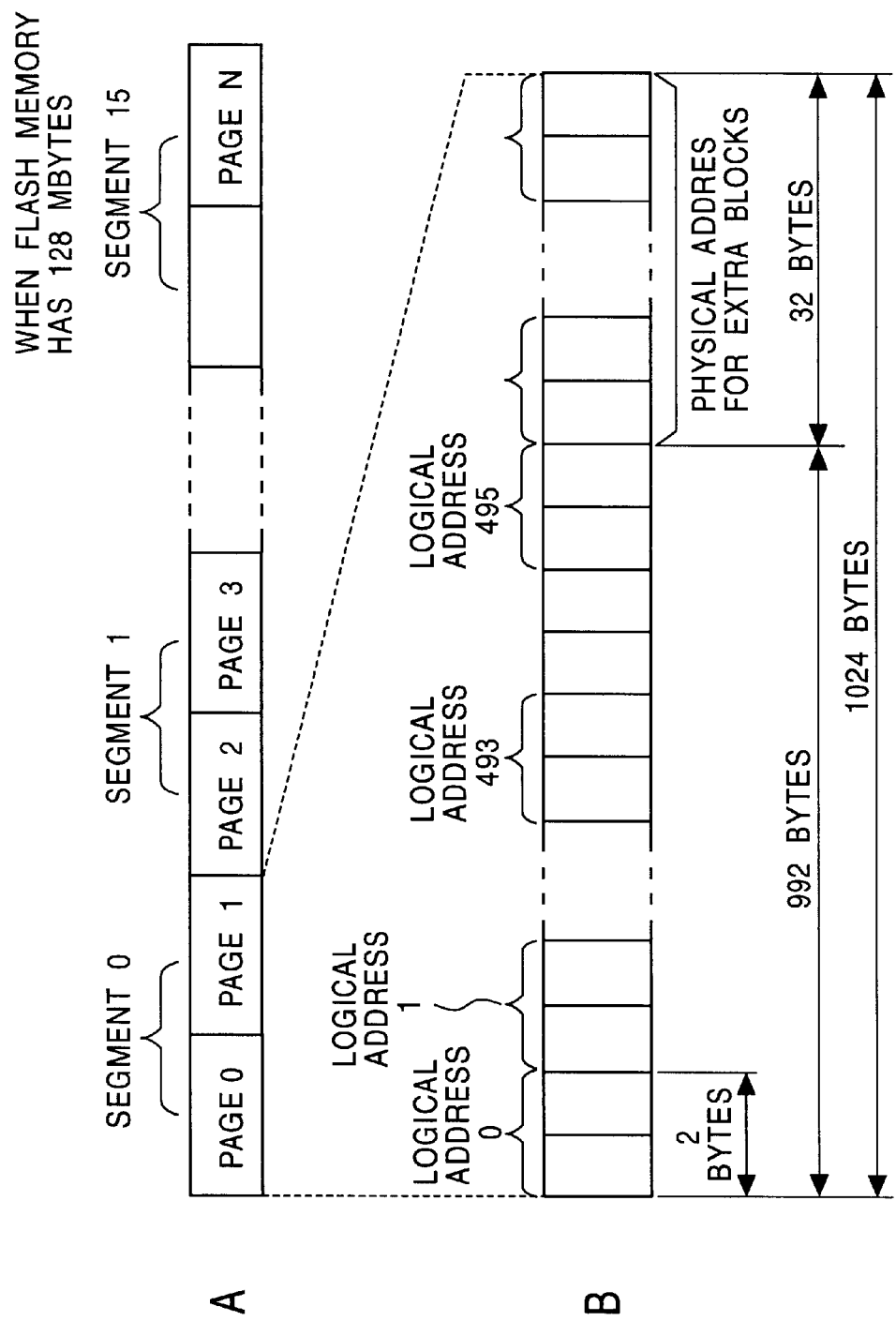
FIG. 7 illustrates the structure of the logical/physical address translation table used in an embodiment of the present invention.

The structure of the logical/physical address translation table based on the concept shown in FIG. 6 is shown in FIG. 7 by way of example. The logical/physical address translation table is stored in a block within the final segment of the flash memory, as indicated in A of FIG. 7.

As indicated in A of FIG. 7, among pages dividing a block, which have been discussed with reference to A and D of FIG. 3, an area for two pages, i.e., page 0 and page 1, is assigned to the logical/physical address translation table for segment 0. For example, since a flash memory having a capacity of 4 MB has only one segment, as discussed with reference to FIG. 8, only page 0 and page 1 serve as an area for storing the logical/physical address translation table.

A flash memory having a capacity of 8 MB has two segments. Accordingly, page 0 and page 1 are assigned to the logical/physical address translation table for segment 0, and the subsequent page 2 and page 3 are allocated to the logical/physical address translation table for segment 1.

Thereafter, with an increased capacity of the flash memory, an area of every two pages is assigned to the logical/physical address translation table for each segment. Since there are 16 segments for a flash memory having a maximum capacity of 128 MB, 32 pages are assigned to the logical/physical address translation tables for segment 0 through segment 15. Accordingly, the maximum page number N indicated in A of FIG. 7 is 31. As is seen from the foregoing description, the logical/physical address translation tables are managed in units of segments.

As represented in B of FIG. 7, a two-page data area indicates the structure of the logical/physical address translation table for one segment. That is, since the data area for one page is 512 bytes, as indicated in E of FIG. 3, 1024 (=512×2) bytes are expanded in B of FIG. 7.

The two-page data area having 1024 bytes is divided into fields of two bytes, as indicated in B of FIG. 7, in which the divided two-byte fields are assigned as logical address 0, logical address 1, and so on, and the final two bytes, i.e., the 991st byte and the 992nd byte from the head, are defined as a field for logical address 495. Then, the associated physical addresses are written into the corresponding two-byte fields. Consequently, in the logical/physical address translation table used in this embodiment, when updating the relationship between the physical address and the logical address due to block swapping for data updating, the storage arrangement of the physical address is updated on the basis of the logical address, thereby overwriting the table information.

The remaining 32 bytes, i.e., the 993rd byte through the final 1024th byte, are assigned to a field for storing physical addresses for extra blocks. That is, the physical addresses for 16 extra blocks are managed. The extra blocks are so-called "work blocks", which are set for temporarily saving, for example, data to be updated in units of blocks.

Although one segment is divided into 512 blocks, the number of manageable blocks is set to be 496 blocks corresponding to logical address 0 through logical address 495, in the table structure indicated in B of FIG. 7. This is because the above-described extra blocks are set and a certain number of blocks are allowed for defective areas (unusable areas) in the flash memory. Accordingly, in practice, a considerable number of defective blocks can be contained in the flash memory. It is thus sufficient to set the logical/physical address translation table in such a manner that only 496 blocks (write/erase enabled blocks) can be managed.

In a block in which the logical/physical address translation table is stored, '0' is set in bit number 3 of the management flags of the redundancy area of each page, as shown in FIG. 4. It is thus possible to identify that the corresponding block stores the logical/physical address translation table.

In the block storing the logical/physical address translation table, when overwriting the content of the logical/physical address translation table, a swapping processing is always performed, as indicated in A and B of FIG. 5. Accordingly, the block storing the logical/physical address translation table is not fixed, i.e., it is not possible to store the logical/physical address translation table in a specific block.

Thus, the FAT accesses the flash memory to search for a block in which '0' is set in bit number 3 of the management flags, thereby identifying the block storing the logical/physical address translation table. To facilitate the search for the block storing the logical/physical address translation table, it is specified in this embodiment that the block storing the logical/physical address translation table is within the final segment. This enables the FAT to search only the final segment for the block storing the logical/physical address translation table. In other words, there is no need to search all the segments in the flash memory for the logical/physical address translation table.

The logical/physical address translation table shown in FIG. 7 is stored, for example, when the stick-type memory 1 is manufactured.

Referring to FIG. 8 again, the relationship between the capacity of the flash memory and the size of the logical/physical address translation table is shown.

As stated with reference to FIG. 7, the size of the logical/physical address translation table for managing one segment is 1024 bytes for two pages, i.e., 1 KB. Accordingly, when the flash memory has a capacity of 4 MB (one segment only), the size of the logical/physical address translation table is 1 KB, as indicated in E of FIG. 8. When the flash memory has a capacity of 8 MB (2 segments), the size of the logical/physical address translation table is 2 KB (4 pages).

When the capacity of the flash memory is 16 MB, the size of the logical/physical address translation table is 4 KB (8 pages) for the flash memory having 2048 blocks (4 segments), and is 2 KB (4 pages) for the flash memory having 1024 blocks (2 segments).

With respect to the flash memories having a capacity of 32 MB (4 segments), 64 MB (8 segments), and 128 MB (16 segments), the size of the logical/physical address translation table is 4 KB (8 pages), 8 KB (16 pages), and 16 KB (32 pages), respectively.

3 Configuration of Drive System

Figure 9:
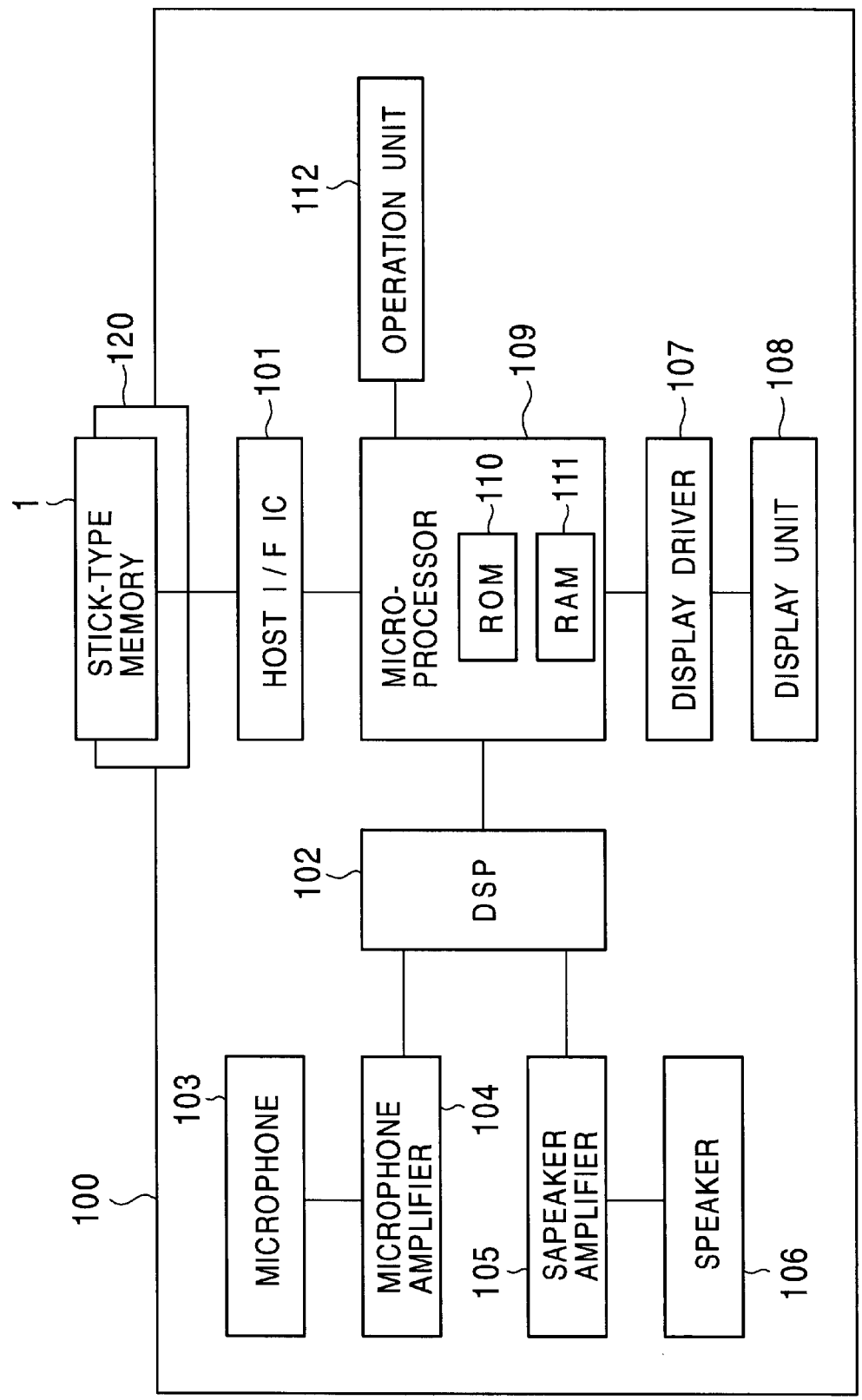
FIG. 9 is a block diagram illustrating a drive system according to an embodiment of the present invention.

The configuration of a drive system of this embodiment is as follows. FIG. 9 illustrates the configuration of the main unit of the drive system for reading, writing, and editing data in correspondence with the above-described stick-type memory 1. A drive-system main unit 100 and the stick-type memory 1 form a file storage system.

Various types of main data can be read from and write into the stick-type memory 1 by the drive-system main unit 100, such as moving-picture data, still-image data, messages recorded through a microphone, high-quality audio data (hereinafter referred to as "music data") recorded from recording media, such as a compact disc (CD, trademark) and a mini disc (MD, trade mark), and control data.

In this embodiment, for simple representation, it is now assumed that the drive-system main unit 100 is a system for recording and reproducing message data, which serve as main data. However, an input/output system and a processing system for data, such as moving pictures, still images, or music, may be provided for the drive-system main unit 100, so that the drive-system main unit 100 serves as a storage system for the corresponding data files.

A loading/unloading mechanism 120 for detachably loads the stick-type memory 1 into the drive-system main unit 100 is provided. Data communications between the stick-type memory 1 loaded into the loading/unloading mechanism 120 and a microprocessor 109 are performed via a host interface (I/F) IC 101.

A microphone 103 is also provided for the drive-system main unit 100, and sound collected by the microphone 103 is supplied to a digital signal processor (DSP) 102 via a microphone amplifier 104 as a sound signal. The DSP 102 converts the input sound signal into digital audio data and performs predetermined signal processing, such as encoding, on the digital audio data, which is then supplied to the control microprocessor 109 as recording data. The microprocessor 109 is able to execute processing for recording the data on the stick-type memory 1 via the host interface IC 101.

The microprocessor 109 also reads audio data or a message data file recorded on the stick-type memory 1 via the host interface IC 101 and outputs the read audio/message data to the DSP 102. The DSP 102 then performs predetermined signal processing, such as decoding, on the supplied data, and outputs the data in the final form of an analog sound signal to a speaker amplifier 105. The speaker amplifier 105 amplifies the input audio data and outputs it to a speaker 106, thereby playing back audio sound.

The microprocessor 109 also controls a display driver 107 to display a predetermined image, for example, menus and guides for user operation or the contents of the file stored in the stick-type memory 1, on a display unit 108. Image data, such as moving pictures or still images, stored in the stick-type memory 1 may be read and displayed on the display unit 108.

An operation unit 112 is provided with various keys used for performing operations on the drive-system main unit 100 by a user. The microprocessor 109 receives a command in response to the operation performed on the operation unit 112 and executes predetermined control processing in accordance with the command. The content of operations may be an instruction for storing a file, selecting a file, reproducing a file, dividing a file, which will be described later, or editing a file.

The configuration of the drive-system main unit 100 shown in FIG. 9 is an example only, and is not intended to restrict the configuration of the invention. That is, any type of electronic device may be used for the drive-system main unit 100 as long as data communications can be performed with the stick-type memory 1.

4 FAT Structure

As described in the file system process hierarchy shown in FIG. 2, the file management processing is performed by the FAT. More specifically, to read/write (reproduce/record) data from/into the stick-type memory 1 by the drive system shown in FIG. 9, the FAT refers to the file storage locations in response to a request from the application process of the file system process hierarchy, and the above-described logical/physical address translation is performed, thereby making it possible to access the stick-type memory 1.

The FAT management structure is discussed below with reference to FIG. 10. In this embodiment, the FAT and the logical/physical address translation table are stored in the stick-type memory 1. Accordingly, the FAT structure illustrated in FIG. 10 is managed in the stick-type memory 1.

Figure 10:
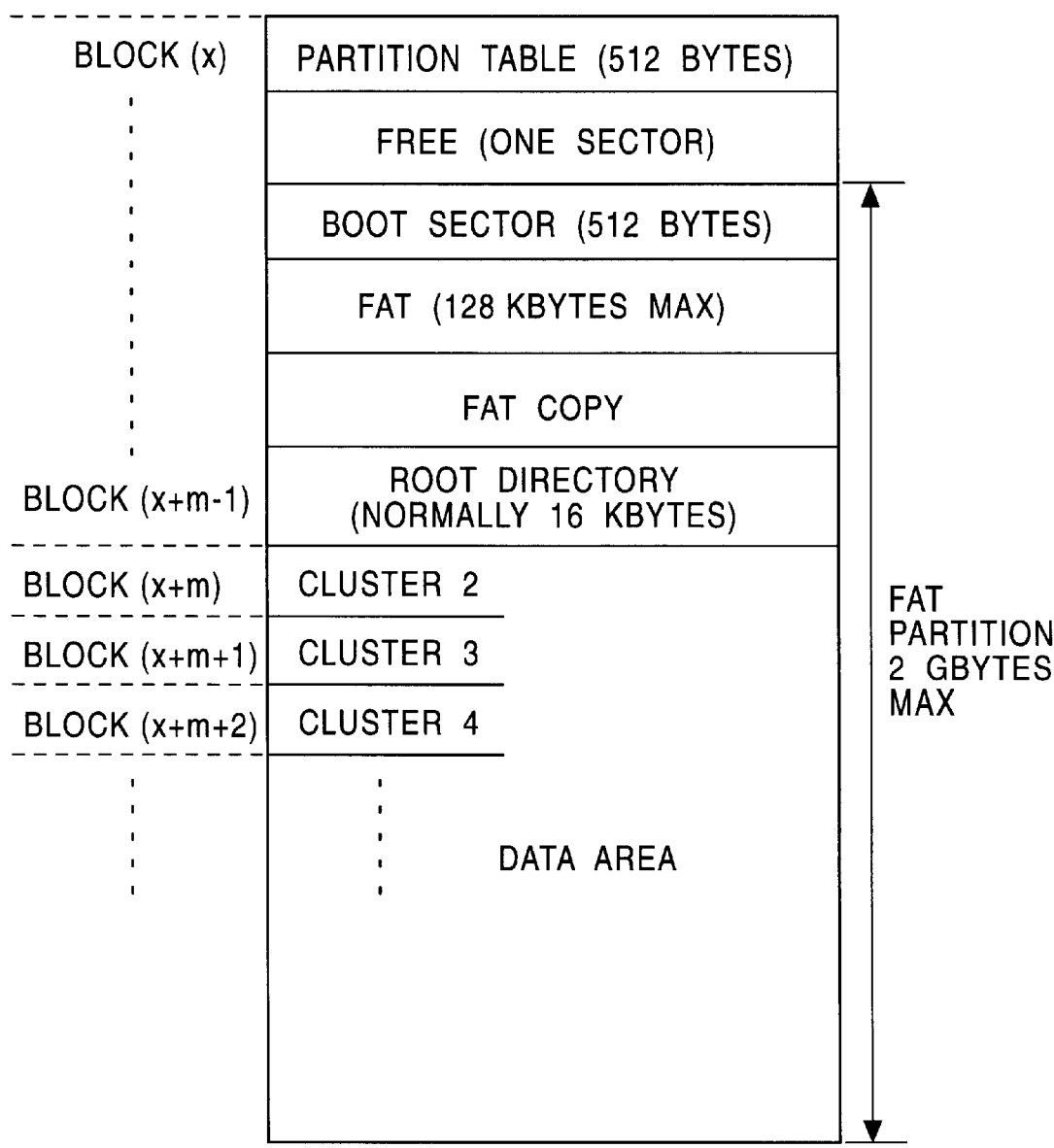
FIG. 10 illustrates the structure of a file allocation table (FAT)

The FAT management structure is formed of, as shown in FIG. 10, a partition table, a free space, a boot sector, a FAT, a FAT copy, a root directory, and a data area.

In the data area, data units, such as cluster 2, cluster 3, and so on, are used. The cluster is a data unit, i.e., a management unit, handled by the FAT. Generally, in the FAT, the standard size of the cluster is 4 KB, and may be any power of two between 512 bytes and 32 KB.

In this embodiment, as stated above, one block is 8 KB or 16 KB. In a stick-type memory 1 having each block of 8 KB, the cluster size of the FAT is 8 KB. In a stick-type memory 1 having each block of 16 KB, the cluster size of the FAT is 16 KB. That is, 8 KB or 16 KB is used both for the size of a data unit used by the FAT management and for the size of a data unit as a block of the stick-type memory 1, namely, the cluster size handled by the FAT is equal to the block size of the corresponding stick-type memory 1. Accordingly, in the interests of brevity, it is now assumed that one block is equal to one cluster.

The block numbers are indicated by x to (x+m−1), (x+m), (x+m+1), (x+m+2), and so on, at the left side of FIG. 10, and various data forming the FAT structure are stored in the corresponding blocks in this manner. In practice, however, data are not necessarily stored in physically consecutive blocks, as indicated by the arrangement shown in FIG. 10.

Referring to the FAT structure, in the partition table, the header address and the end address of a FAT partition having a maximum capacity of 2 GB are stored. The boot sector indicates whether the FAT is a 12 bit FAT or a 16 bit FAT, and also indicates the FAT structure. The FAT structure includes the size of the FAT, the cluster size, and the size of each area.

The FAT is a table representing the link structure of clusters forming a corresponding file, which will be discussed below. In the area subsequent to the FAT, a FAT copy is stored. The root directory stores a file name, a leading cluster number, and various attributes. 32 bytes are used for describing each file.

In the FAT, the relationship between the entry of the FAT and the cluster is a one-to-one correspondence. In the entry of each cluster, the linked cluster, i.e., the subsequent cluster number, is described. That is, concerning a file formed of a plurality of clusters (blocks), the leading cluster number is indicated in the directory, and the second cluster number is represented in the entry of the leading cluster of the FAT. The third cluster number is represented in the entry of the second cluster number. In this manner, the cluster link is described in the FAT.

Figure 11:
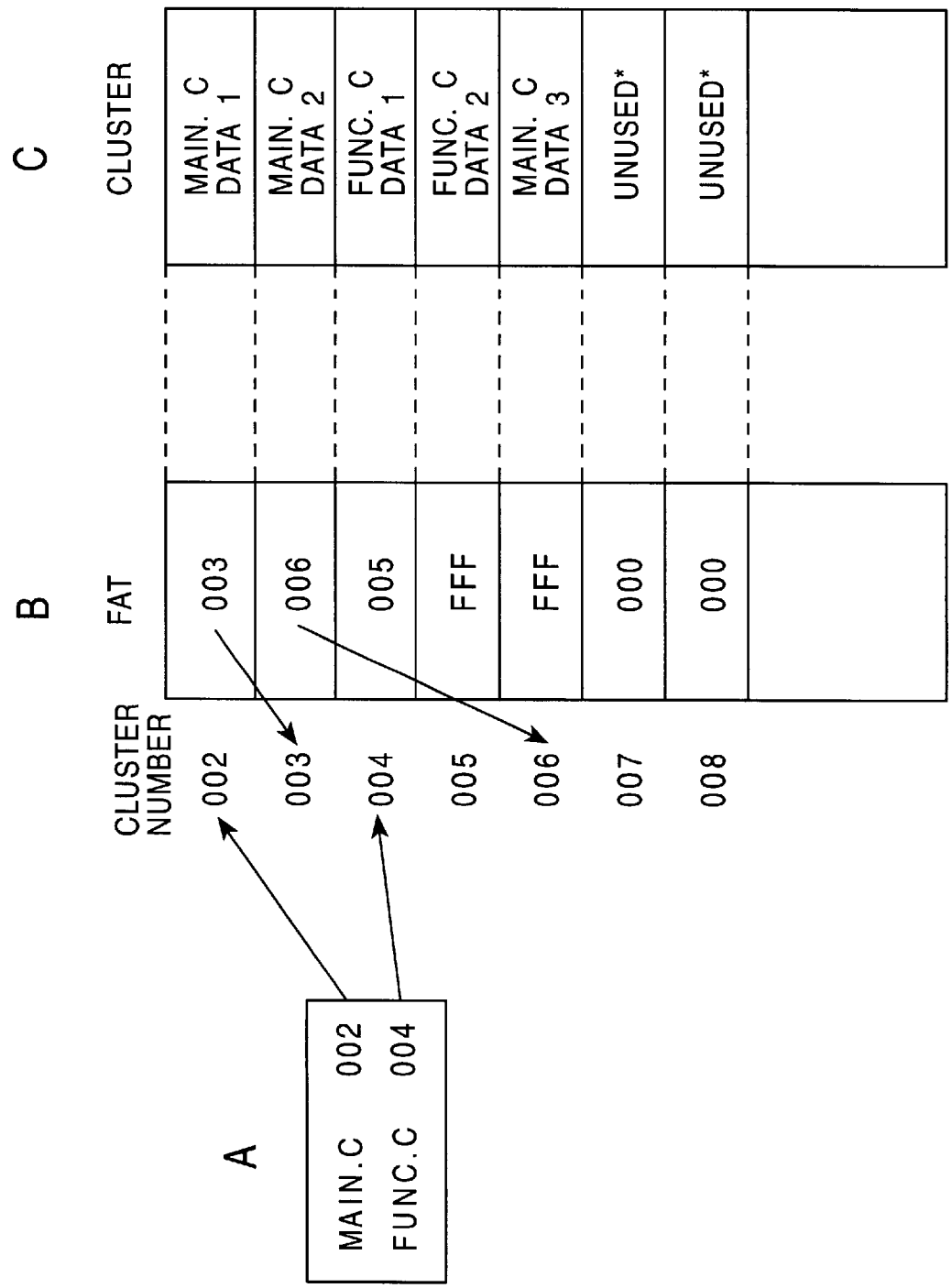
FIG. 11 illustrates the linked structure of clusters on the FAT.

The concept of the linked structure of clusters is schematically shown in FIG. 11, the numbers shown in FIG. 11 being represented in hexadecimal. If two files, such as MAIN.C and FUNC.C are stored, the leading cluster numbers, for example, 002 and 004, of the two files, are described in the directory.

Regarding the file MAIN.C, the subsequent cluster number 003 is indicated in the entry of the leading cluster number 002, and the next subsequent cluster number 006 is described in the entry of the cluster number 003. If the cluster number 006 is the final cluster of this file MAIN.C, FFF, which represents the final cluster, is described in the entry of the cluster number 006.

Accordingly, the file MAIN.C is stored in the order of cluster 002, 003, and 006. That is, assuming that the cluster number matches the block number of the stick-type memory 1, the file MAIN.C is stored in the blocks 002, 003, and 006 in the stick-type memory 1. However, as stated above, since the cluster handled by the FAT is equal to the logical address, it does not necessarily match the physical address.

Similarly, the FAT shows that the file FUNC.C is stored in the order of the clusters 004 and 005, as indicated by B and C of FIG. 11.

In the entry of clusters corresponding to unused blocks, 000 is indicated.

In the directory of each file stored in the root directory, not only the leading cluster number indicated in A and B of FIG. 11, but also various data, such as those shown in FIG. 12, are described. That is, a file name, an extension, an attribute, a reserved area, the latest update time information, and the latest update date information, a leading cluster number, and a file size are stored by the number of bytes indicated in parentheses.

A sub-directory, which is equal to a layer lower than a directory, is stored in the data area rather than in the root directory shown in FIG. 10, namely, the sub-directory is handled as a file having a directory structure. The size of the sub-directory is unlimited, and an entry in the sub-directory and an entry in the root directory are required.

Figure 13:
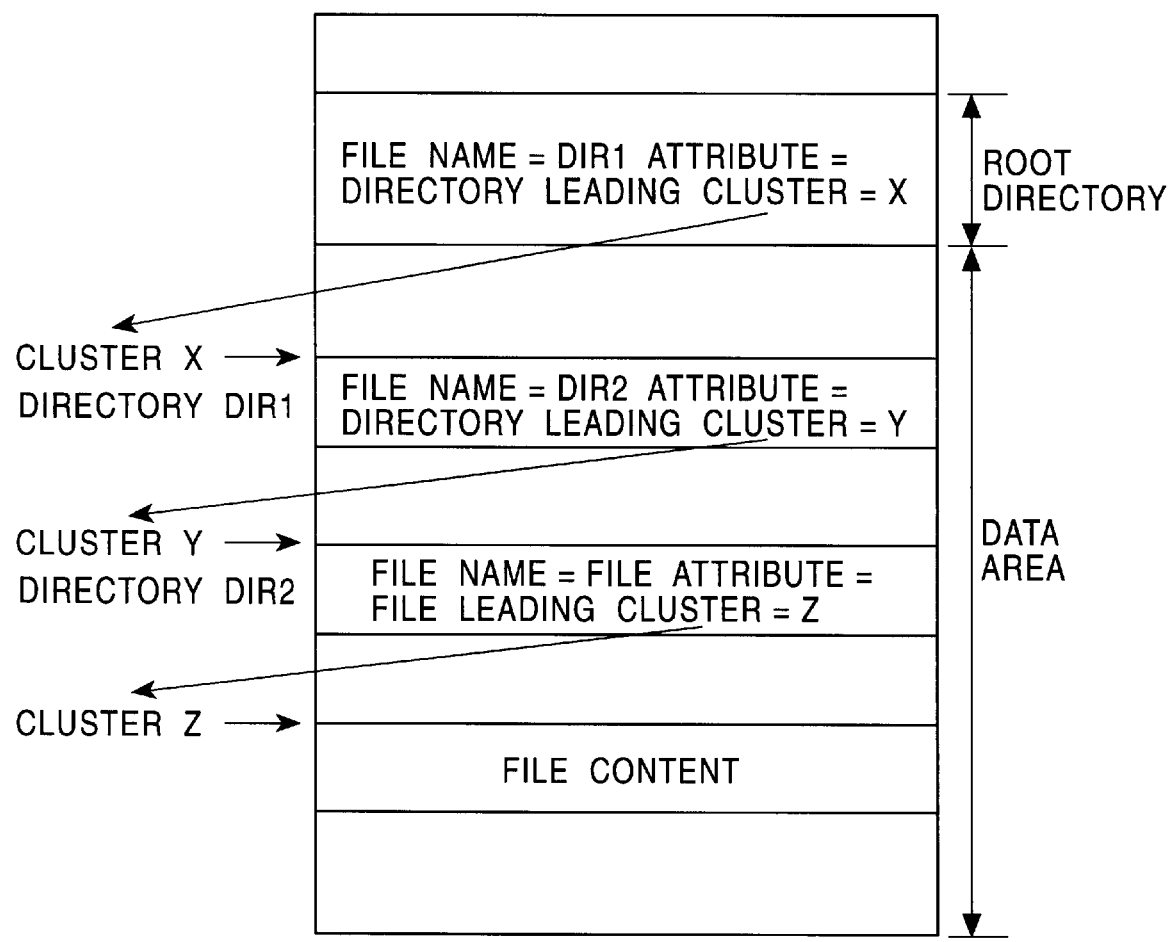
FIG. 13 illustrates the sub-directories and the file storage content.

FIG. 13 illustrates an example of the structure in which a file DIR1 whose attribute is a directory is stored in the root directory, a file DIR2 whose attribute is a directory is stored in the file DIR1, and finally, a file FILE exists in the file DIR2.

The leading cluster number of the file DIR1, which serves as a sub-directory, is indicated in the root directory, namely, the clusters X, Y, and Z are linked by the above-described FAT. FIG. 13 reveals that the sub-directories DIR1 and DIR2 are handled as files and are integrated into the FAT link.

Figure 29:
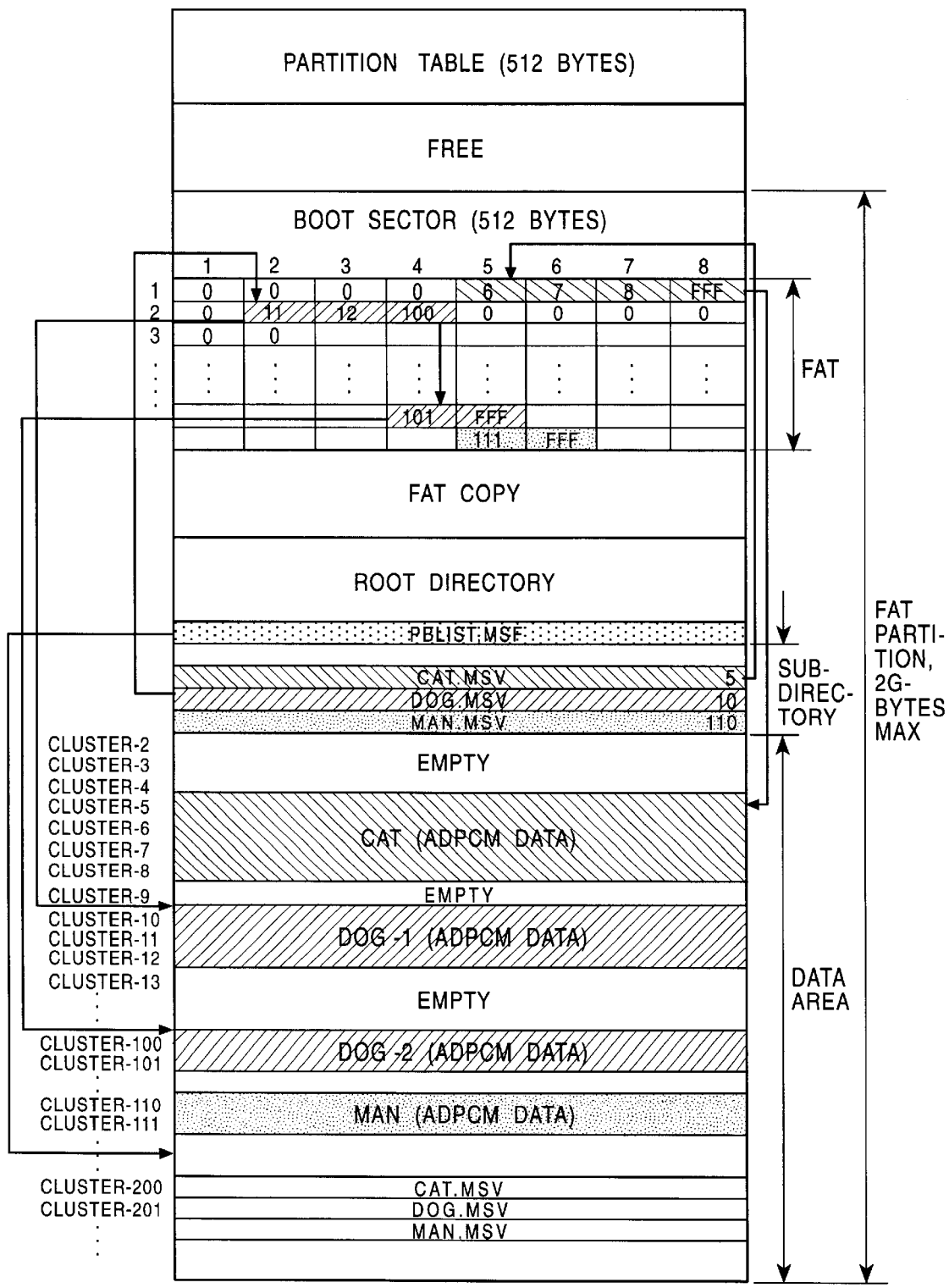
FIG. 29 illustrates the FAT structure before a dividing operation is performed.

The foregoing description of the FAT structure is summarized with reference to FIG. 29. A FAT management method is discussed below with reference to the schematic diagram of a memory map of FIG. 29.

In the memory map, a partition table, a free space, a boot sector, a FAT, a FAT backup area, a root directory, a sub-directory, and a data area are formed from the top of the memory map shown in FIG. 29.

The memory map shown in FIG. 29 is a map obtained after performing logical/physical address translation based on the logical/physical address translation table.

The aforementioned boot sector, the FAT, the FAT backup area, the root directory, the sub-directory, and the data area are collectively referred to as a "FAT partition area". In the above-described partition table, the header address and the end address of the FAT partition area are recorded. Generally, a partition table is not provided for a FAT used by a floppy disk.

A free space is created since no data other than the partition table is stored in the first track.

The subsequent boot sector indicates whether the FAT is a 12 bit FAT or a 16 bit FAT, and the size of the FAT structure, the cluster size, and the size of each area are recorded according to the type of FAT.

The FAT manages the locations of files stored in the data areas. The file backup area is an area in which the FAT is copied.

Part of the root directory stores a file name, a leading cluster address, and various attributes, and 32 bytes are used for each file.

Part of the sub-directory serves as a file whose attribute is a directory, and in the example of FIG. 29, four files, such as PBLIST.MSV, CAT.MSV, DOG.MSV, and MAN.MSV, are stored in the sub-directory. Part of the sub-directory manages file names and storage locations of the files in the FAT. More specifically. in the sub-directory shown in FIG. 29, the FAT address "5" is stored in the slot on which the file name CAT.MSV is recorded, and the FAT address "10" is stored in the slot on which the file name DOG.MSV is recorded. The FAT address "110" is stored in the slot on which the file name MAN.MSV is recorded.

The cluster 2 and the subsequent clusters are used as the actual data area, and voice data compressed by an adaptive differential pulse code modulation (ADPCM) method is recorded in the data area.

In this embodiment, ADPCM-compressed voice data under the file name CAT.MSV is recorded in the cluster 5 through the cluster 8. ADPCM-compressed audio data, i.e., DOG-1, which is the first part of the file name DOG.MSV, is recorded in the cluster 10 through the cluster 12, while, ADPCM-compressed audio data, i.e., DOG-2, which is the second part of the file name DOG.MSV, is recorded in the clusters 100 and 101. ADPCM-compressed audio data under the file name MAN.MSV is recorded in the clusters 110 and 111.

FIG. 29 shows an example in which a single file is divided and is discretely recorded in the clusters. The clusters of the data area indicated by "empty" are free spaces for recording data.

The cluster 200 and the subsequent clusters are used for managing the file names. The file CAT.MSV is recorded in the cluster 200, the file DOG.MSV is recorded on the cluster 201, and the file MAN.MSV is recorded in the cluster 202.

The file order may be rearranged in the cluster 200 and the subsequent clusters.

When the stick-type memory 1 configured as described above is first inserted, the header of the memory, i.e., the partition table is referred to, thereby identifying the header address and the end address of the FAT partition area. After reading part of the data from the boot sector, the data stored in the root directory and the sub-directory are reproduced. Then, by searching for the slot on which the reproducing management information recorded on the sub-directory, i.e., PBLIST.MSV, is recorded, the end address of the slot on which PBLIST.MSV is recorded is checked. In this embodiment, since the address "200" is indicated at the end of the slot on which PBLIST.MSV is recorded, reference is made to the cluster 200.

In the cluster 200 and the subsequent clusters, the file names are managed, and also, the order of reproducing the files is managed. In this embodiment, the file CAT.MSV is a first track to be reproduced, the file DOG.MSV is a second track, and the file MAN.MSV is a third track.

Upon completion of referring to all the clusters after the cluster 200, reference is again made to the sub-directory, thereby searching for the slots matching the file names CAT.MSV, DOG.MSV, and MAN.MSV. In the map table shown in FIG. 29, the address "5" is indicated at the end of the slot on which the file name CAT.MSV is recorded. The address "10" is stored at the end of the slot on which the file name DOG.MSV is recorded. The address "110" is indicated at the end of the slot on which the file name MAN.MSV is recorded.

Then, after searching the entry address of the FAT based on the address "5", the cluster address "6" is found as an entry. By referring to the entry address "6", the cluster address "7" is found as an entry, and by referring to the entry address "7", the cluster address "8" is found as an entry. By further referring to the entry address "8", code "FFF" indicating the end of the file is recorded.

Accordingly, the file CAT.MSV occupies the clusters 5, 6, 7, and 8, and by referring to the clusters 5, 6, 7, and 8 of the data area, it is possible to access the area on which the ADPCM-compressed data named CAT.MSV is actually recorded.

A method for searching for the discretely recorded file DOG.MSV is as follows.

The address "10" is indicated at the end of the slot on which the file DOG.MSV is recorded. After searching the entry address on the FAT based on the address "10", the cluster address "11" is found as an entry. By referring to the entry address "11", the cluster address "12" is found as an entry. By referring to the entry address "12", the cluster address "100" is found as an entry. By further referring to the entry address "100", the cluster address "101" is found as an entry. By finally referring to the entry address "101", code FFF indicating the end of the file is recorded.

Accordingly, the file DOG.MSV occupies the clusters 10, 11, 12, 100, and 101, and by referring to the clusters 10, 11, and 12 of the data area, the area on which ADPCM data corresponding to the first part of the file DOG.MSV is recorded can be accessed. By further referring to the clusters 100 and 101 of the data area, the area on which ADPCM data corresponding to the second part of the file DOG.MSV is recorded can be accessed.

In regard to the file name MAN.MSV, by searching the entry address on the FAT based on the address "110", the cluster address "111" is found as an entry. By referring to the entry address "111", code "FFF" representing the end of the file is recorded. Thus, the file MAN.MSV occupies the clusters 110 and 111.

As described above, data portions of a file which is discretely recorded on a flash memory can be interconnected and be sequentially reproduced.

Figure 30:
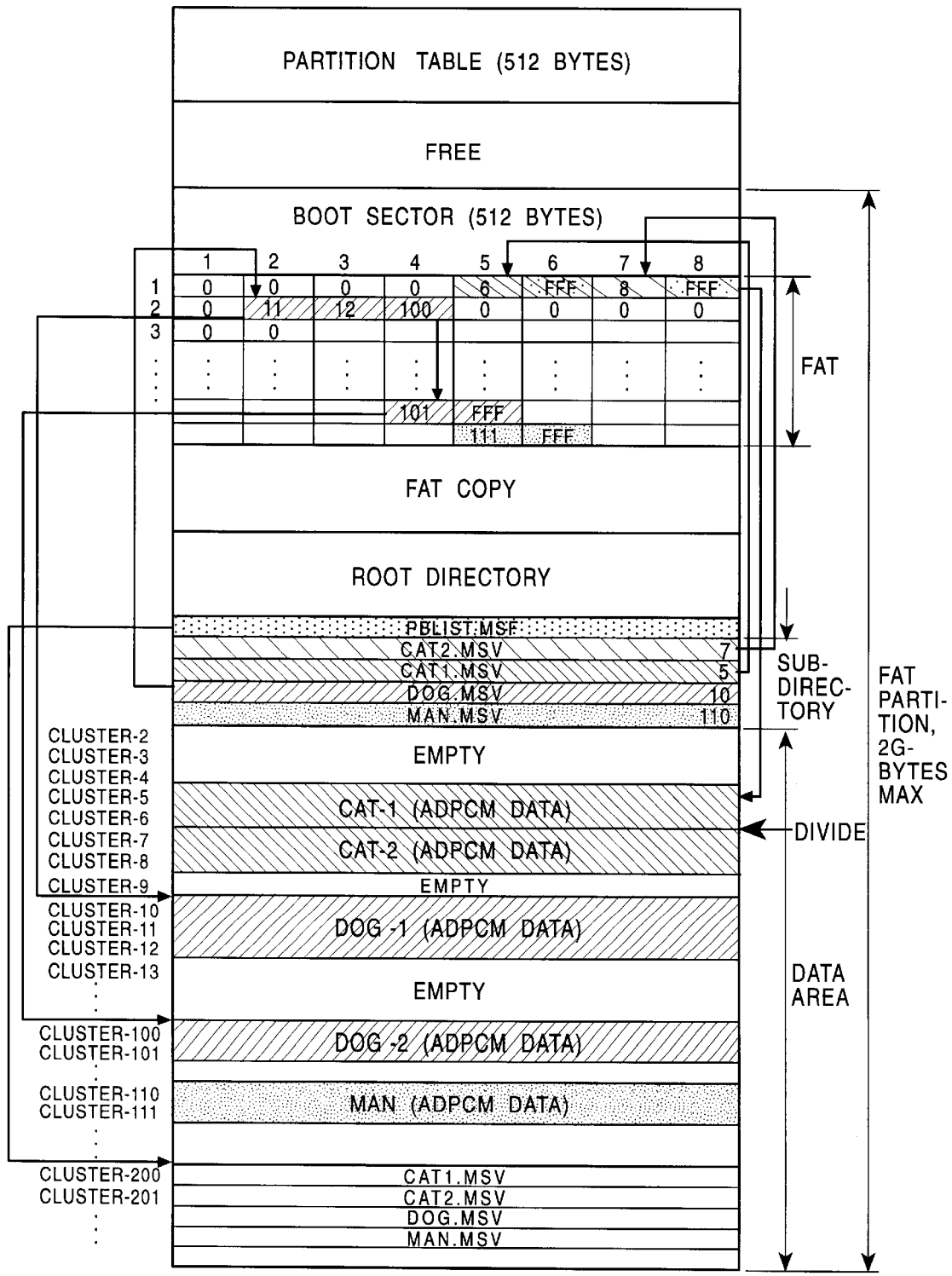
FIG. 30 illustrates the FAT structure after a dividing operation is performed.

A description is now given of dividing the file CAT.MSV among the three files shown in FIG. 29. FIG. 30 illustrates a memory map when the file CAT.MSV is divided. The editing process on the FAT when the dividing operation is performed is as follows.

It is now assumed that a user performs a dividing operation at the boundary between the cluster 6 and the cluster 7, with the result that two files, i.e., CAT1.MSV and CAT2.MSV are created.

The files DOG.MSV and MAN.MSV, which were previously recorded on the clusters 201 and 202, respectively, are first shifted to the clusters 202 and 203, respectively. Then, the file name of the cluster 200 is changed to CAT1.MSV, which is a combination of CAT1 input by the user and an identifier MSV, and CAT2.MSV, which is a combination of CAT2 input by the user and an identifier MSV, is recorded on the cluster 201.

Subsequently, CAT.MSV recorded on the sub-directory is overwritten by CAT1.MSV, and CAT2.MSV is recorded on an unused slot.

The cluster number "7", in which CAT2.MSV is stored, is recorded at the end of the slot on which CAT2.MSV is recorded. Thereafter, the entry address "6" on the FAT is overwritten by "FFF" so that the end of the file indicated by the CAT1.MSV slot of the sub-directory can be the cluster 6.

5 File Structure of Stick-type Memory 5.1 Directory configuration

The file structure stored in the stick-type memory 1 is as follows. A description is first made of the directory configuration with reference to FIG. 14.

Figure 14:
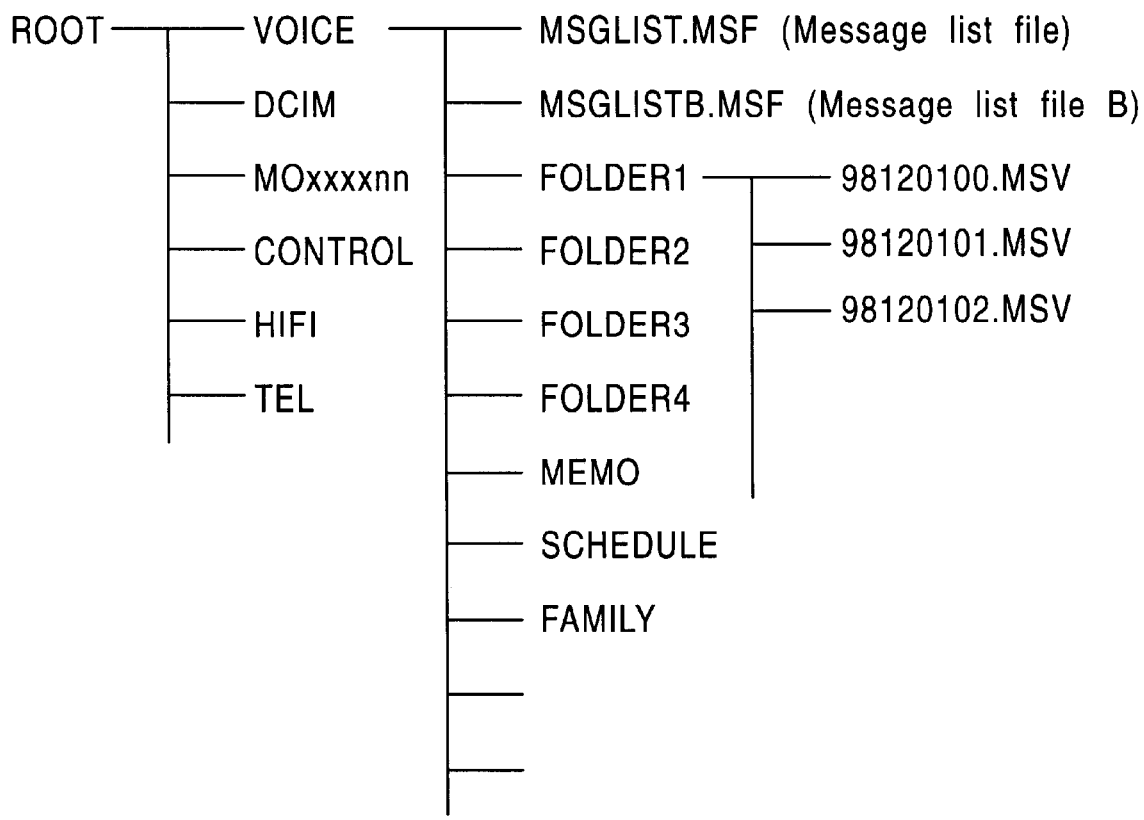
FIG. 14 illustrates the directory structure of the stick-type memory according to an embodiment of the present invention.

As stated above, main data that can be handled by the stick-type memory 1 include moving-picture data, still-image data, message data recorded from a microphone, high-quality audio data recorded from recording media, such as CD and MD, control data, telephone directory data, etc. Accordingly, in the directory configuration, as illustrated in FIG. 14, a message directory (VOICE), a still-image directory (DCIM), a moving-picture directory (MOxxxxnn), a control directory (CONTROL), a music directory (HIFI), and a telephone directory (TEL) are disposed under a root directory.

In this embodiment, the directory configuration is discussed in detail below in the context of message-data files. As sub-directories of the directory VOICE, a Message list file (MSGLIST.MSF), a Message list file B, (MSGLISTB.MSF), which is a copy of the Message list file, folders (FOLDER1 and FOLDER2) and so on, are formed, as shown in FIG. 14. Actual message data files, for example, a file name 98120100.MSV, are formed within the folders.

The above-described directory configuration is an example only, and another folder may be formed under a folder, such as under FOLDER1.

The VOICE directory structure is registered in a message list file and is created arbitrarily by the corresponding drive system. The message list file serves as a management file for the directory structure, and has a backup copy within the stick-type memory 1, thereby preventing the data from being inadvertently erased.

5.2 Message list file

The structure of the message list file is discussed below with reference to FIGS. 15 through 18. The numbers shown in rows and columns of the drawings are hexadecimal byte numbers.

FIG. 15 illustrates the data configuration of the message list file. The first 32 bytes of the message list file are used as a header, followed by a 64-byte folder entry and a plurality of 32-byte message entries. In this manner, a predetermined number of combinations of a folder entry and message entries are disposed in the message list file.

In the message list file constructed as described above, the order of arranging folders designated by the folder entry indicates the switching of the folders and the order of displaying the folders. The order of arranging message data designated by the message entry indicates the switching and display of the message data, and the order of reproducing the message data.

The 32-byte header structure of the message list file is shown in FIG. 16. In the header, as illustrated in FIG. 16, a four-byte message list file ID (MSG-ID), a two-byte format version number (FMT-VER), a two-byte maker code (MCode), an eight-byte editing date and time (YMDHMSW), a four-byte file number (FILE-NO), a two-byte folder entry size (FSIZE), a two-byte message entry size (MSIZE), a two-byte folder entry offset (OFFSET), a two-byte character code (CCODE), and a two-byte revision number (REV) are described. In the header, (R) stands for reserved, and the same abbreviation applies to FIGS. 17, 18, and 20.

The leading message list file ID (MSG-ID) is a fixed value, such as 0x4D53474C (="MSGL"), indicating that the corresponding file is a message list file.

The format version number (FMT-VER) indicates a version number of the format which is defined in a system for storing voice data files in the stick-type memory 1, thereby making it possible to identify the currently used version number. The upper byte of the number represent the major number, and the lower two byte indicate the minor number, so that 0x0100, for example, represents version 1.0.

The maker code (MCode) represents a code of the maker and the model of a system which most recently edited the message list file. The editing date and time (YMDHMSW) indicates the year, month, date, hour, minute, second, and the day of the week at which the message list file was most recently edited. Binary values are used in which a total of eight bytes are assigned: two bytes for the year and one byte for each of the other information. A specific value is set in the information indicating the day of the week (Monday to Sunday).

The file number (FILE-NO) represents the file number of a message which was most recently created. The file number is indicated as a serial number used for creating message file names, and is incremented every time a new file is created, thereby reserving a value for a subsequently created file name. The file number is reset to zero when the date is changed.

The folder entry size (FSIZE) indicates the size of a folder entry (FOLDER ENTRY) shown in FIG. 15, and is a fixed value, for example, 64 (bytes).

The message entry size (MSIZE) represents the size of a message entry (MESSAGE ENTRY) shown in FIG. 15, and is a fixed value, for example, 32 (bytes).

The folder entry offset (OFFSET) represents the location at which the first folder entry starts by an offset value from the start of the file. For example, for the start position of the folder located from 0x0020 to 0x005F shown in FIG. 15, 32 is set as the offset value from the start of the file.

The structure of the folder entry is shown in FIG. 17. In the folder entry, a two-byte folder ID (FLD-ID), a two-byte maker code (MCode), a 12-byte folder name (FLD-NAME), a two-byte character code (C-CODE), and a 44-byte display name (DISP-NAME) are described.

The folder ID is a fixed value, for example, 0x4644 (="FD"), for identifying the header of the folder entry data. The maker code (MCode) represents a code of the maker and the model of a system that created the corresponding folder.

As the folder name (FLD-NAME), the folder name on the FAT is recorded in a character string, such as a directory name represented in code defined by, for example, JIS X 0201. The folder name is basically formed of a directory name having a maximum of eight bytes, a dot ("."), and an extension having a maximum of three bytes. If the extension is unnecessary, only the directory name may be indicated without an extension and a dot. A terminal symbol 0x00 is indicated at the end of a character string, though it may be omitted due to the lack of space if the character string occupies the whole recording area of the folder name.

The character code (C-CODE) is a code for identifying a character code which describes the subsequent display name, and indicates, for example, 0x90 for JIS X 0208-1997 (so-called "shifted JIS code") or 0x03 for ISO8859-1.

The display name (DISP-NAME) indicates a folder name displayed on a system and is recorded in a character string, i.e., in a character code designated by the above-described C-CODE. At least one byte of terminal symbol 0x00 is recorded at the end of the character string, and the values after 0x00 are arbitrary. The recording of the terminal symbol is unnecessary due to the lack of space if the folder name occupies the whole recording area of the display name. If the system automatically creates the display name, the folder name on the FAT is recorded.

The structure of the message entry is shown in FIG. 18. The message entry is formed of a one-byte message ID (MID), a one-byte priority (PRI), a one-byte alarm mode (AL-M), a 5-byte alarm date (AL-DATE), an 8-byte file name (FILE-NAME), and a 6-byte recording time and date (REC-DATE).

The message ID is a fixed value, for example, 0x4D (="M") for identifying the head of the message entry data.

The priority (PRI) represents the significance (or priority) of a message, and is indicated by four levels, for example, from 0x00 to 0x03, a greater value indicating a higher priority. When the priority (PRI) is not specified, 0x00 is set.

The alarm mode (AL-M) indicates an alarm function mode. The individual bits are defined as follows.

| | |
|---|---|
| bit 1 = 0, bit 0 = 0 | operating at the designated time |
| bit 1 = 0, bit 0 = 1 | operating at the designated day of the week |
| bit 1 = 1, bit 0 = 0 | operating at the designated time, date, and month |
| bit 1 = 1, bit 1 = 1 | RESERVED |

If the alarm function is not used, the alarm mode (AL-M) is set to be 0x00. When both bit 5 and bit 6 indicate 1, operations are performed in the order of issuing the alarm sound, reproducing the message, and erasing the message.

The alarm date (AL-DATE) represents the time and date at which the alarm is operated, and is indicated by a binary value in the order of the year, month, day, hour, minute, and the day of the week, each piece of information having one byte. The year is indicated as an offset value from the year 1980. The values 0 through 127 represent the year 1980 through the year 2107. If the year is not set, 0xFF is set. The use of values other than 0 through 127 and 0xFF is prohibited.

In the file name (FILE-NAME), the message file name on the FAT is recorded, and a file name without an extension is recorded in code defined by, for example, JIS X 0201. The terminal symbol 0x00 is recorded at the end of the character string, though it may be omitted due to the lack of space if the character string occupies the whole recording area of the file name.

In the recording date (REC-DATE), the time and date at which a message is recorded is stored in a one-byte binary value in the order of the year, month, date, hour, minute, and second. The year is represented as an offset value from the year 1980. The values 0 through 127 represent the year 1980 through the year 2107. If the year is not set, 0xFF is set. The use of values other than 0 through 127 and 0xFF is prohibited.

The message list file constructed as described above is located immediately under the VOICE directory, and is shared for use among the individual systems.

When a system first identifies the stick-type memory 1, such as when the system is reset or when the stick-type memory 1 is inserted into the system, the following operations (1) through (7) are performed.

(1) It is first checked whether the sub-directory entries in the VOICE directory match the content of the message list file.

(2) A newly created sub-directory is added to the message list file.

(3) An erased sub-directory is deleted from the message list file. (The operations (2) and (3) are required because a sub-directory may be added or deleted without performing an editing operation of the message list file on a personal computer (PC).)

(4) It is checked whether the file entries in the sub-directory under the VOICE directory match the content of the message list file.

(5) A newly created file is added to the message list file.

(6) An erased file is deleted from the message list file. (The operations (5) and (6) are required because a file may be added or deleted without performing an editing operation of the message list file on a PC.)

(7) If there is no directory used in the system, a directory is newly created.

The size of the message list file is fixed to be 32736 bytes (32×1024−32). 0x00 is set in a 32-byte area after the final message entry. The maximum number of messages (FAT files) that can be entered is 1020 when the number of sub-directories under the VOICE directory is one. In the message list file, a folder entry (sub-directory) requires an area equal to two message entry areas, and thus, as the number of folder entries increases by one, the number of messages which can be entered decreases by two.

5.3 Message data file

A message data file for storing actual message data is as follows. The file name of the message data file is registered in the message list file and is arbitrarily created by the system.

Figure 19:
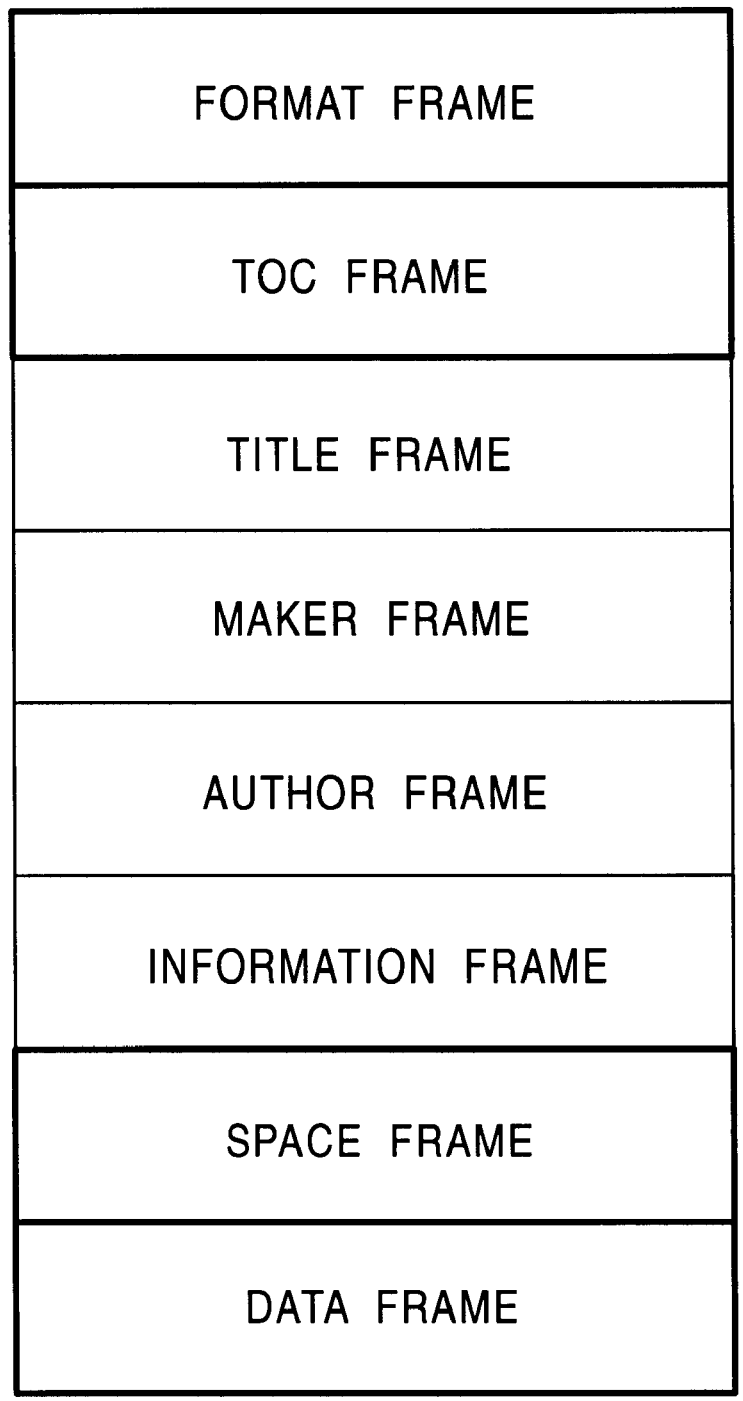
FIG. 19 illustrates the data structure of a message data file according to an embodiment of the present invention.

FIG. 19 illustrates the data structure of a message data file. The message data file is formed of a format frame (FORMAT FRAME), a TOC frame (TOC FRAM), a title frame (TITLE FRAME), a maker frame (MAKER FRAME), an author frame (AUTHOR FRAME), an information frame (INFORMATION FRAME), a space frame (SPACE FRAME), and a data frame (DATA FRAME). However, the provision of the TITLE FRAME, the MAKER FRAME, the AUTHOR FRAME, and the INFORMATION FRAME is optional, and the message data file is basically formed by the FORMAT FRAME, the TOC FRAME, the SPACE FRAME, and the DATA FRAME, which are surrounded by the solid lines of FIG. 19.

The format frame serves as basic management information for the corresponding message data file and indicates the codec type, etc., which will be discussed in detail later.

The TOC frame serves as management information indicating the arrangement of the individual frames of the message data file, in other words, the frame structure of the message data file can be identified by the TOC frame.

In the data frame, actual message data is stored. The space frame, which will be discussed in detail later, is a reproduce disabled (unusable) area, which serves as a reserved area for expanding the TOC frame or is used for setting a reproduce disabled area within a file.

A plurality of data frames and a plurality of space frames may be provided within the same file, though the other frames are provided only singly in the same file. The format frame is always disposed at the head of the file, immediately followed by the TOC frame.

The title frame, the maker frame, the author frame, and the information frame, which are optional, are collectively disposed after the TOC frame in ascending order of a frame ID (discussed later). The space frame always follows the above-mentioned optional frames.

The structure of the format frame is shown in FIG. 20. The format frame is an essential frame in which the codec type, etc., is described, and it must be located at the head of the frame.

The format frame is formed of, as shown in FIG. 20, an eight-byte file ID (FILE-ID), a four-byte size-of-format-frame (SIZE-FMT), a two-byte format version number (FMT-VER), a 16-byte company name (C-NAME), a 16-byte set name (S-NAME), a two-byte set firmware version number (SET-VER), an eight-byte recording time and date (DATE-TIME), two-byte format ID (FMT-ID), a two-byte number of channels (CHAN), a four-byte sampling frequency (samples per second) (SAMP), a four-byte average bytes per second (BYTE), a two-byte block alignment (ALIGN), a two-byte bits per sample (BIT), and a two-byte size-of-extra-area (EXT). An extra area may be provided.

The file ID (FILE-ID) indicates that the corresponding file is a voice format file (a sound data file format in this embodiment) using, for example, ISO8859-1 character code. The file ID is a fixed value of, for example, MS_VOICE.

The size-of-format-frame (SIZE-FMT) represents the size of the format frame in byte units. As described in detail below, the TCO frame can be accessed because of this description of the size of the format frame.

The format version number (FMT-VER) indicates the version of the voice format. The upper one byte indicates the major version number, and the lower one byte represents the minor version number. For example, 0x0100 is the version 1.0, and 0x0203 is the version 2.3.

The company name (C-NAME) designates the name of the company which created the file in the form of a character string by using, for example, ISO8859-1 character code. The terminal code 0x00 is set at the end of the character string, though it may be omitted due to the lack of space if the character string occupies the whole area of the company name.

The set name (S-NAME) indicates the name of the system which created the file in the form of a character string by using, for example, ISO8859-1 character code. The terminal code 0x00 is set at the end of the character string, though it may be omitted due to the lack of space if the character string occupies the whole area of the set name.

The set firmware version number (SET-VER) indicates the version of the system firmware. The upper one byte indicates the major version number, and the lower one byte designates the minor version number. For example, 0x0100 is version 1.0, and 0x0203 is version 2.3.

The recording time and date (DATE-TIME) is represented by a binary value in which two bytes are assigned to the year, and one byte is allocated to each of the other pieces of information, such as the month, day, hour, minute, second, and the day of the week.

The codec type is set in the format ID (FMT-ID) as follows.

| | |
|---|---|
| 0x0002 | G726 ADPCM 22 kHz/3 bits |
| 0x0005 | G726 ADPCM 11 kHz/3 bits |
| 0x0007 | G726 ADPCM 8 kHz/4 bits |
| 0x0009 | G726 ADPCM 8 kHz/2 bits |

The number of channels (CHAN) indicates the number of channels as follows.
0x0001 monophonic
0x0002 stereo The samples per second (SAMP) designates the sampling frequency as follows.

| | |
|---|---|
| 0x00001F40 | 8 kHz |
| 0x00002B11 | 11.025 kHz |

The average bytes per second (BYTE) represents the number of bytes per second, which is used for calculating the reproducing time from the data size.

The block alignment (ALIGN) indicates in byte units a group of data that cannot be separated, which is used for locating the start of data. For example, 0x0030 is 46 bytes, and 0x0010 is 16 bytes.

The bits per sample (BIT) indicates the number of bits per sample as follows.

| | |
|---|---|
| 0x0004 | 4 bits |
| 0x0003 | 3 bits |
| 0x0002 | 2 bits |

In the size-of-extra-area (EXT), the size of an area for describing information unique to the codec (extra data area) is indicated in byte units. That is, if an extra data area is created, the size of the area is indicated. The extra data area is created in units of 16 bytes. If the extra data area is not necessary, 0x00000 is set in the size-of-extra-area (EXT).

Figures 31, 32:
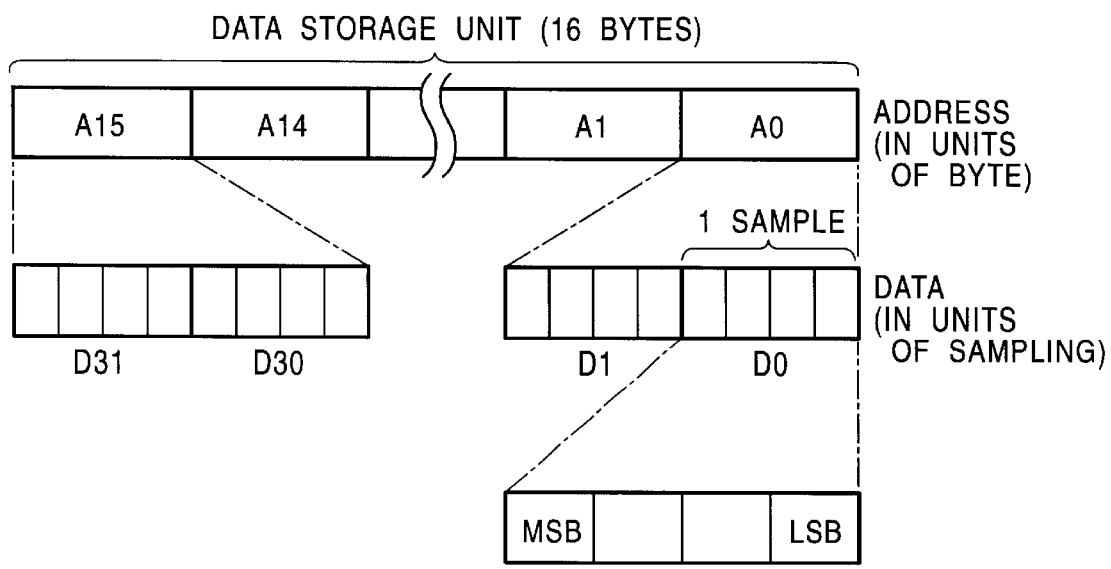
FIG. 31 illustrates the data structure of the TOC frame according to an embodiment of the present invention.
FIG. 32 illustrates an example of a data storage unit and a data storage content according to an embodiment of the present invention.

After the format frame, the TOC frame shown in FIG. 31 is disposed. In the TOC frame, the arrangement of the individual frames in a file is described. Since eight bytes are used for each frame, the size of the TOC frame results in a value which is the product of 8 bytes and the total number of frames. Accordingly, the size of the TOC frame varies according to addition or deletion of a frame. If the total number of frames is an odd number, 0x00 is set in an unused eight-byte area at the end of the TOC frame. In FIG. 31, 0x00 is set in the addresses from 0x0028 to 0x002F.

The configuration of the eight bytes used for one frame is as follows.

| | |
|---|---|
| frame ID (FRAME ID) | 1 byte |
| reserved (RESERVED) | 3 bytes (fixed value 0x00) | frame size (FRAME SIZE) 4 bytes

The frame type is defined by the frame ID as follows.

| | |
|---|---|
| format frame | 0x01 |
| TOC frame | 0x02 |
| space frame | 0x03 |
| data frame | 0x04 |
| title frame | 0x05 |
| maker frame | 0x06 |
| author frame | 0x07 |
| information frame | 0x08 |

The frame size represents the size of the frame specified by the frame ID in byte units.

In the TOC frame, a group of the above-described eight-byte data is described in the order of the arrangement of the frames. A specific example of the TOC frame will be discussed below.

According to the contents of the TOC frame, the frame structure of the corresponding sound data file can be identified. In making access to the sound data file, the format frame is first identified, and then, the contents of the TOC frame are checked. As stated above, the TOC frame can be accessed because of the description of the size of the format frame in the size-of-format-frame (SIZE-FMT). That is, the head address of the TOC frame is an address which is offset from the head of the file by the value of the size-of-format-frame.

As stated above, after the TOC frame, the title frame, the maker frame, the author frame, and the information frame may be provided.

The title frame is a frame for recording the title, and the two leading bytes indicate, for example, the character code type of the recorded title as follows.

| | |
|---|---|
| 0x0000 | JIS x 0208-1997 (SJIS) |
| 0x0001 | ISO8859-1 |

The size of the title frame is an integral multiple of 16 bytes, and the terminal code 0x00 is set at the end of the character string of the title.

The maker frame represents a company name, a machine name, and a firmware version number of the machine which created a file. In the maker frame, as well as in the title frame, the two leading bytes designate the character code type, followed by a character string. The size of the maker frame is an integral multiple of 16 bytes, and the terminal code 0x00 is set at the end of the character string.

The author frame represents the name of an author (copyright holder) as a character string. The two leading two bytes designate the character code type, followed by a character string. The size of the author frame is an integral multiple of 16 bytes, and the terminal code 0x00 is set at the end of the character string.

The information frame is a frame for recording additional information. The additional information includes an album name, an artist name, and a conductor name. The additional information may further include the number of playbacks when average volume learning is performed. The first byte designates the information category ID, and the third and fourth bytes represent the character code type in which an information character string is described. A character string is stored from the ninth byte of the frame header. The size of the information frame is an integral multiple of 16 bytes, and 0x00 is set in an unused area.

After the aforementioned optional frames or the TOC frame, the space frame follows. The provision of the space frame, which serves as a reproduce disabled area, is essential. It is thus necessary to skip the space area when the data is reproduced. The space area is used as a reserved area for expanding the TOC frame or used when a reproduce disabled area is created in one cluster due to the execution of a dividing operation (described below). Any type of data may be stored within the space frame, and specific dummy data may be recorded. The size of the space frame is an integral multiple of 16 bytes. The handling of the space frame will be discussed in detail below.

Figure 33:
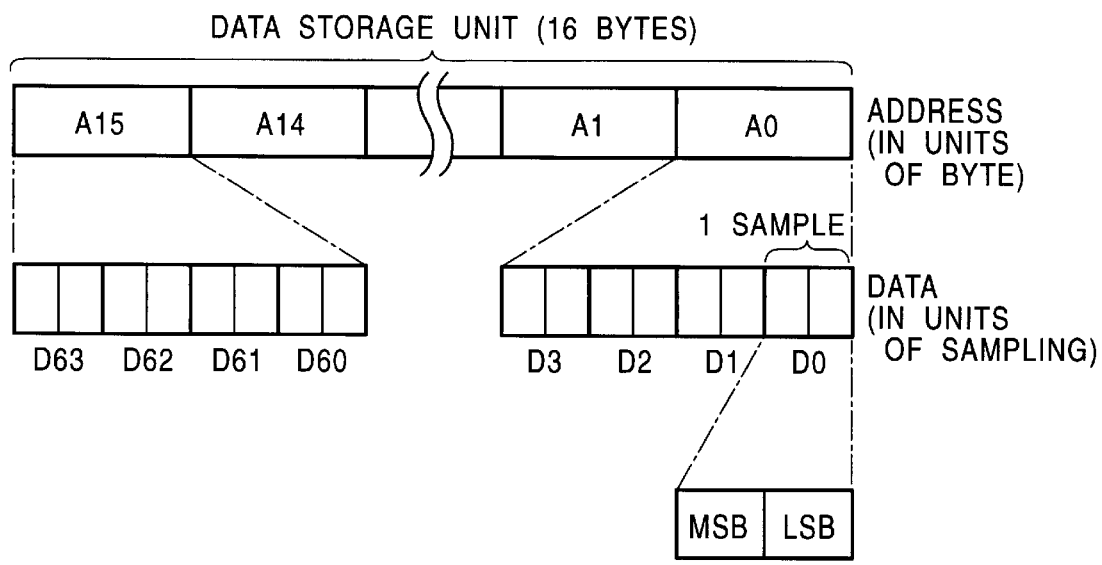
FIG. 33 illustrates another example of a data storage unit and a data storage content according to an embodiment of the present invention.
Figure 34:
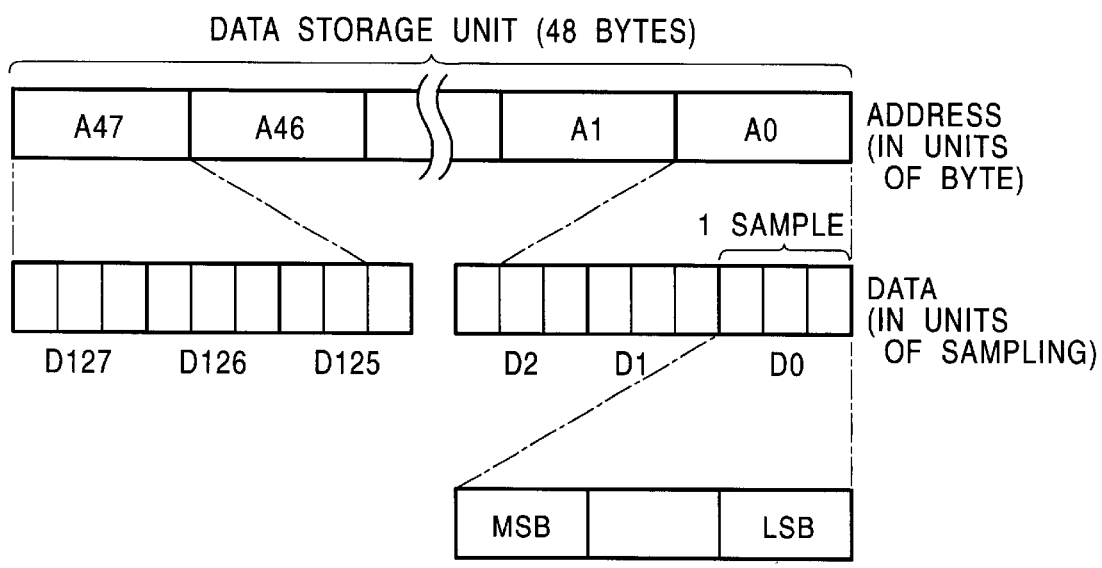
FIG. 34 illustrates still another example of a data storage unit and a data storage content according to an embodiment of the present invention.

In the data frame, actual message data is stored. The message data is stored with no space as a specified number of bits starting from the most significant bit (MSB) of the header byte of the data frame. For the storage boundary of data, the byte boundary is used. For example, for four-bit data and two-bit data per sampling, such as the data shown in FIGS. 32 and 33, respectively, the storage boundary of data is one byte. For three-bit data per sampling, such as the data illustrated in FIG. 34, the storage boundary of data is three bytes. When the voice data is divided, the above-mentioned storage unit is used as a data unit.

The message data file is configured by the above-described various frames. An example of the frame configuration of the message data file is shown in FIGS. 21A through 22B. In the following description, it is assumed that a title frame, a maker frame, an author frame, and an information frame, which are optional, are not provided.

Figures 21A, 21B:
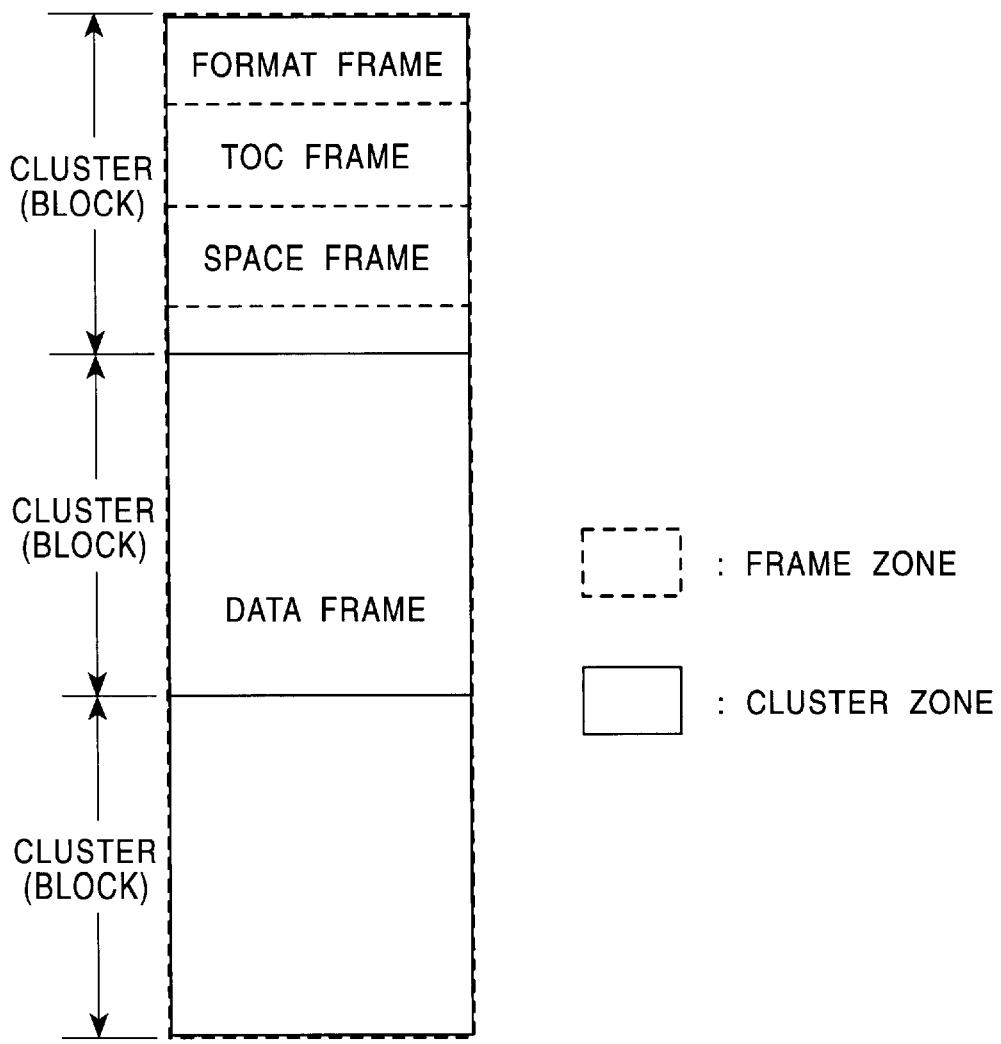
FIG. 21A illustrates an example of the frame structure of the message data file according to an embodiment of the present invention.
FIG. 21B illustrates the contents of the TOC frame of the message data file shown in FIG. 21A.

The frame structure configured when sound data is normally recorded is as shown in FIG. 21A. The format frame, the TOC frame, the space frame, and the data frame are formed from the head of the file, as illustrated in FIG. 21A. A plurality of blocks (clusters) forming the single file are blocks linked by the FAT, and are not necessarily physically consecutive blocks, as stated above.

The information of the above-described frame structure is indicated in the TOC frame, such as the information shown in FIG. 21B.

As discussed above, a plurality of items of information, each having eight bytes, are disposed in the order of the arrangement of frames. In the first eight-byte field, the frame ID, i.e., 0x01, is set, and the size of the format frame follows. In the second eight-byte field, 0x02 is set in the frame ID, and the size of the TOC frame follows. Since the number of frames is four, the size of the TOC frame results in 4×8 bytes=32 bytes (=0x00000020). In the third eight-byte field, 0x03 is set in the frame ID, and the size of the space frame follows. In the final eight-byte field, 0x04 is set in the frame ID, followed by the size of the data frame.

Figures 22A, 22B:
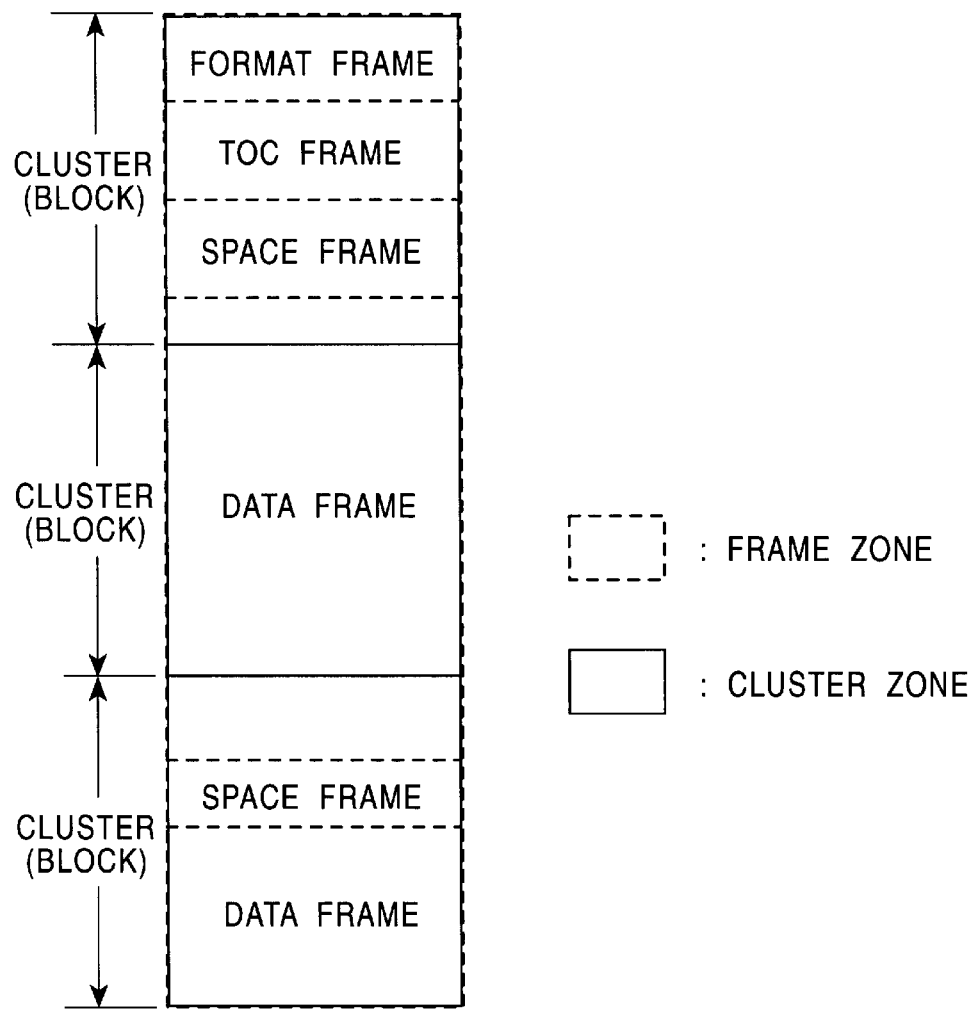
FIG. 22A illustrates another example of the frame structure of the message data file according to an embodiment of the present invention.
FIG. 22B illustrates the contents of the TOC frame of the message data file shown in FIG. 22A.

In the message data file, part of data may be erased and set to be a reproduce protect area by using the space frame. For example, it is now assumed that there is a message portion within the data frame that is to be erased and not reproduced, as shown in FIG. 22A, and such a message portion is replaced with the space frame. Since the space frame is skipped while the data is being reproduced, it is as if the message portion has been erased during the reproducing of the data.

When the frame structure has been changed from the structure shown in FIG. 21A to the structure shown in FIG. 22A, the contents of the TOC frame are updated, as illustrated in FIG. 22B.

The size of the first eight-byte format frame remains the same. The frame ID of the second eight-byte field is 0x02. Since the number of frames increases by two to six, the size of the TOC frame is changed to 6×8 bytes=48 bytes (=0x00000030). In the third eight-byte field, 0x03 is set in the frame ID, and the size of the space frame follows. When the TOC frame is expanded by 16 bytes, the size of the space frame decreases by 16 bytes, resulting in 0x00000180.

In the subsequent eight-byte field, the size of the first part of the data frame which contains a message portion that is not to be reproduced and which has been divided by a new space frame is indicated. In the fifth eight-byte field, the size of the new space frame containing the above-mentioned message portion is designated. In the final eight-byte field, the size of the second part of the data frame divided by the new space frame is shown.

The frame structure of the message data file is managed by the TOC frame as discussed above. The contents of the TOC frame are updated according to a change in the frame structure due to addition of a space frame or a data frame or due to the execution of an editing operation, such as a file dividing operation or a file combining operation, which will be discussed in detail below.

Figure 23:
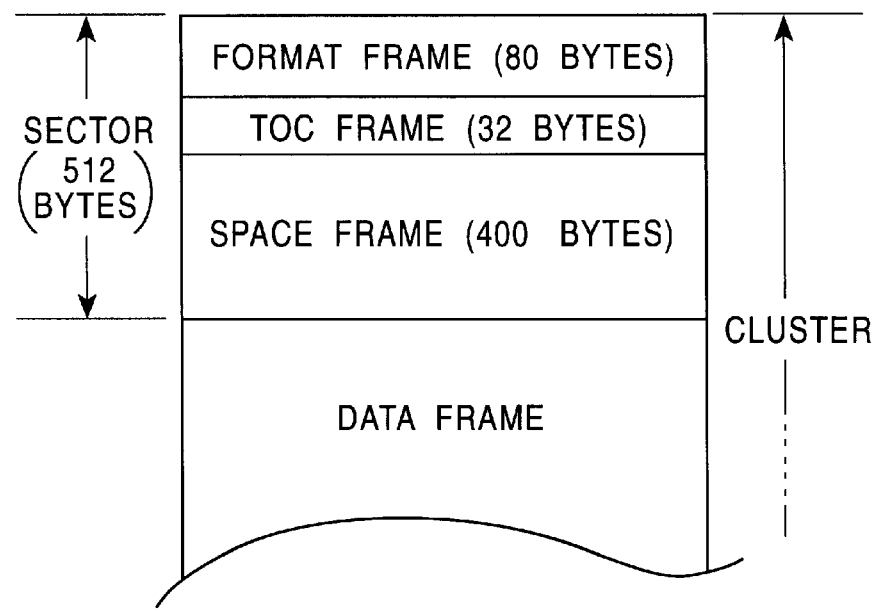
FIG. 23 illustrates a space frame when a message data file is newly created.

The space frame is handled as follows. When a message data file is newly created, a space frame having a size of 128 bytes to 640 (=128+512) bytes is disposed after the TOC frame, as shown in FIG. 23. In this case, the size of the space frame is determined so that the start position of a data frame is located at the sector boundary.

Though it will be described in detail below, when a message data file is divided, a reproduce protect area is set to be a space frame in a cluster including a divide point.

Figure 24:
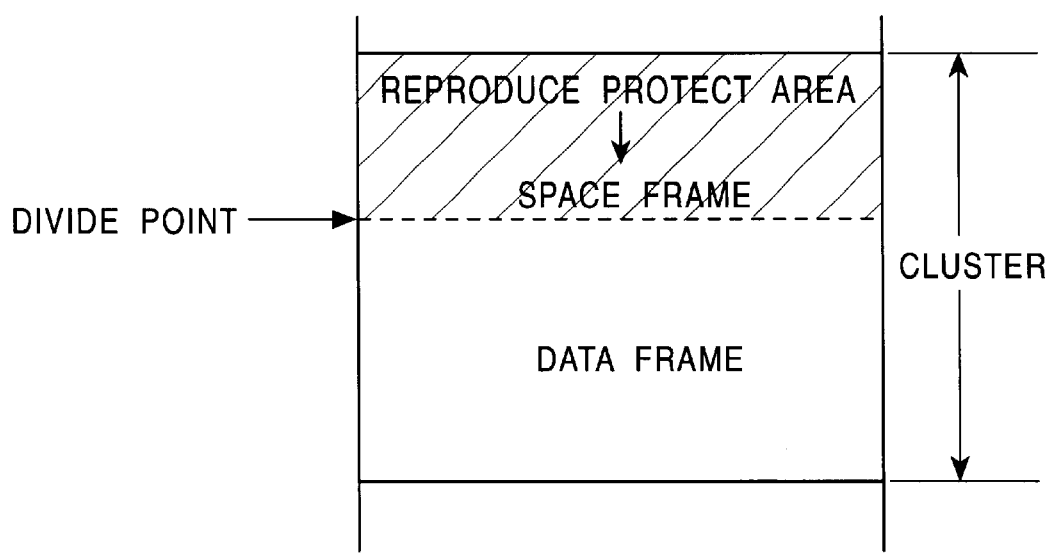
FIG. 24 illustrates a reproduce protect area replaced with a space frame.

More specifically, if a divide point is set within a cluster, as shown in FIG. 24, the head of the message data, i.e., the second part of the file, is located at the divide point. The minimum unit of files is a cluster. Thus, the first part of the file before the divide point within the cluster contains a data portion that is not to be reproduced (the hatched portion in FIG. 24), and such a data portion is replaced by a space frame, so that it can be protected from being reproduced.

After performing a dividing operation or a combining operation of a message data file, two space frames may be located adjacent to each other. In this case, the two space frames are combined to be one space frame, in other words, they are managed as a single space frame by the TOC frame.

As discussed above, a message data file is provided with not only a data frame, but also a format frame, a TOC frame, a title frame, a maker frame, an author frame, an information frame, and a space frame. Above all, the format frame, the TOC frame, and the space frame are essential due to the following reason.

The stick-type memory 1 is usable not only in a drive system, such as the one shown in FIG. 9, but also in an apparatus using a FAT system, such as in a PC.

More specifically, the stick-type memory 1 containing a message data file which is recorded and managed by a drive system, such as the system shown in FIG. 9, is loaded into a PC, so that the file can be moved or the file name can be changed by using the FAT system. However, this disturbs the matching of the resulting file information with the contents of the message data file managed by the message list file. To overcome this drawback, when the stick-type memory 1 is first identified by a drive system, such as the one illustrated in FIG. 9, the sub-directory entries in the VOICE directory are matched with the contents of the message list file. This makes it possible to use the stick-type memory 1 in the drive system even if, for example, a user changes the file name on a PC. In this case, if the message data file is provided directly in the data frame, and also indirectly in other frames, information required for reproducing the data frame is also transferred to the drive system shown in FIG. 9. Thus, even if the file stored in the stick-type memory 1 is moved on a PC, the data can be reproduced in the drive system without causing a serious problem.

In reproducing the message by using the above-described information, the recording time and the remaining time of the message are desirably displayed. In this case, they may be displayed on the display unit 108 of the drive system shown in FIG. 9.

Normally, the file size managed in the FAT file system is displayed in a byte unit. In the message data file, however, the file size is calculated in terms of time in the following manner rather than using the file size managed by the FAT file system.

The total size of the data frames within the message file is first calculated by using the TOC frame, and is then converted into the total reproducing time by using the average bytes per second recorded in the format frame. The remaining time can be calculated by subtracting the reproducing time of the reproduced message from the total reproducing time. According to this calculation technique, calculation errors caused by the amount of data of the space frame and the other frames can be eliminated.

6 Divide Editing Operation

The divide editing operation, which is a feature of the system of this embodiment, is discussed below.

According to the divide editing operation, a certain divide point is specified by a user's instruction so as to divide a single sound data file into two sound data files at the divide point. This operation is described below with reference to FIGS. 9, 25 through 28.

Figure 25:
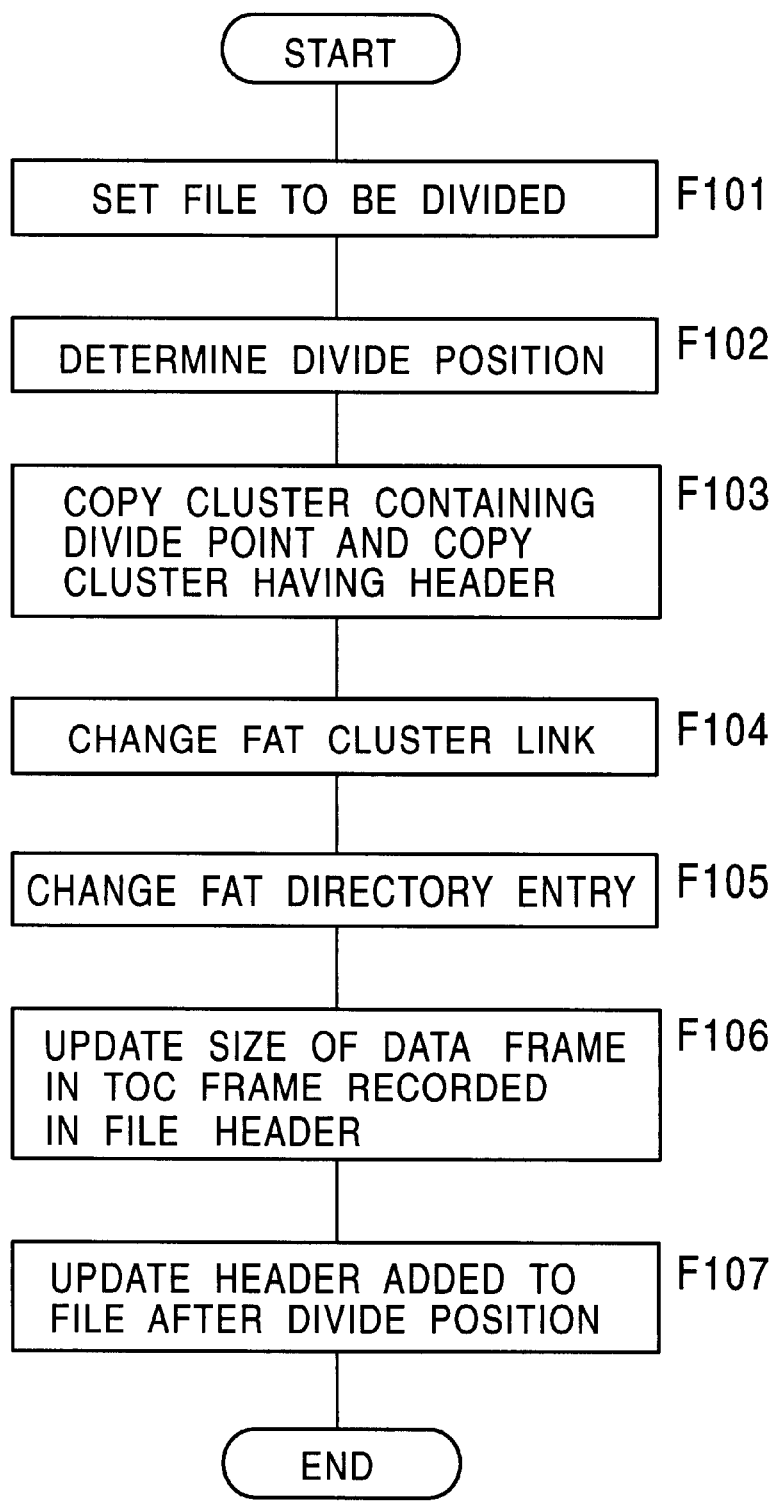
FIG. 25 is a flow chart illustrating a dividing operation according to an embodiment of the present invention.

FIG. 25 is a flow chart illustrating the divide editing operation performed under the control of the microprocessor 109. FIGS. 26A, 26B, and 26C illustrate the concept of dividing a message data file on the stick-type memory 1. FIGS. 27 and 28 illustrate the content of the FAT before and after the dividing operation.

When the stick-type memory 1 is loaded into the drive system, the user is able to identify the message data files stored in the stick-type memory 1 on the display unit 108. If it is desired by the user that a certain message data file be divided into two files, the user selects the message data file to be divided by operating the operation unit 112 while checking the file name displayed on the display unit 108.

After the file is selected by the user, in step F101 of FIG. 25, the microprocessor 109 sets the sound data file to be divided. Subsequently, the user designates the divide point of the selected file. Various operations may be considered to designate the divide point, and for example, the microprocessor 109 may reproduce the selected message data file, and the user may perform an entering operation at a point at which the file is to be divided while listening to the reproduced message. However, this operation may produce a slight displacement from the desired divide point, and thus, a function for fine-adjusting the divide point by the user may preferably be provided.

After designating the divide point by the user, the microprocessor 109 determines the divide point in step F102 and proceeds to a subsequent divide operation. In step F103, if the determined divide point is located within the same cluster (block), data stored in the cluster is copied into an unused cluster, thereby duplicating the data of the cluster containing the divide point. However, if the set divide point is located at the boundary of a cluster (block), there is no need to duplicate data of the cluster, which will be stated in detail below. Additionally, data stored in the cluster at the head of the file including a management header is copied into an unused cluster, thereby duplicating the data of the cluster containing the management header. The management header is a data portion including a format frame, a TOC frame, and a space frame.

In step F104, the cluster link of the FAT is changed, and in step F105, the directory entry of the FAT is changed. Accordingly, a new cluster link is formed so that the original single file can be divided into two files by using the cluster including the divide point which was newly copied in step F103 and the cluster including the management header. This will be discussed in detail below.

Then, in step F106, the TOC frame of the management header which is located at the head of the original file is updated, thereby forming a first file corresponding to the first part of the original file before the divide point.

In step F107, the management header of the cluster which was copied and linked to the head of the file was updated, thereby forming a second file corresponding to the second part of the original file after the divide point.

According to the above-described processing, the dividing operation is completed. An example of the processing for the dividing operation is shown in FIGS. 26A through 28.

It is now assumed that a file F1 shown in FIG. 26A is a message data file selected by the user and is stored in clusters CL(2) through CL(9).

The FAT indicating the cluster link of the file F1 is shown in FIG. 27. The header cluster of the file F1 is a cluster CL2 according to the directory entry (not shown).

In the cluster CL(2) of the FAT, 003 is stored, indicating that the cluster CL(2) is linked to a cluster CL(3). In the entry of the cluster CL(3), 004 is stored, representing that the cluster CL(3) is linked to a cluster CL(4). Thereafter, the link status is similarly recorded, and the value FFF is set in the final cluster CL(9), indicating that the cluster CL(9) is the final cluster.

According to the FAT configured as described above, the storage of the file F1 shown in FIG. 26A in the clusters CL(2) through CL(9) is managed. In an cluster CL(A) and the subsequent clusters, the value 000 is set, i.e., these clusters are unused.

It is now assumed that the user gives an instruction to divide the file F1 at the divide point DP indicated in FIG. 26A. The divide point DP is located within the cluster CL(5). Accordingly, the processing in step F103 shown in FIG. 25 is performed, i.e., the cluster CL(5) is copied into an unused cluster CL(A), and the cluster CL(2) including the management header is copied into an unused cluster CL(B).

Then, in steps F104 and F105, the cluster link and the directory link of the FAT are updated, so that the cluster link shown in FIGS. 26B and 26C is formed. If the two divided files are indicated by files F1-1 and F1-2, the directory entry of the file F1-1 is first formed, and the header cluster is set to be the cluster CL(2).

In the entry of the FAT, as shown in FIG. 28, 003 is set in the cluster CL(2), 004 is set in the cluster CL(3), 00A is stored in the cluster CL(4), and FFF is stored in the cluster CL(A). Thus, the FAT manages the file F1-1 so that the file F1-1 is stored in the order of the clusters CL(2), CL(3), CL(4), and CL(A), as illustrated in FIG. 26B.

Meanwhile, the directory entry of the file F1-2 is formed, and the header cluster is set to be cluster CL(B). In the entry of the FAT, as shown in FIG. 28, 005 is stored in the cluster CL(B), 006 is stored in the cluster CL(5), 007 is set in the cluster CL(6), 008 is set in the cluster CL(7), 009 is stored in the cluster CL(8), and FFF is stored in the cluster CL(9). Accordingly, the FAT manages the file F1-2 so that the file F1-2 is stored in the order of the clusters CL(B), CL(5), CL(6), CL(7), CL(8), and CL(9), as shown in FIG. 26C.

Thereafter, in step F106 of FIG. 25, the management header of the file F1-1, i.e., the contents of the cluster CL(2), is updated. More specifically, the size of the data frame indicated in the TOC frame is updated.

FIG. 26B shows that the final cluster CL(A) is a cluster including the divide point DP, and the second part of the message data after the divide point DP is unnecessary data. Thus, the size of the data frame is changed to the portion defined by the one-dot-chain arrow in FIG. 26B, i.e., the hatched portion is eliminated from the data frame. This makes the hatched portion of the cluster CL(A) invalid, and thus, in the file F1-1, the data portion of the original file F1 before the divide point DP is to be reproduced.

In step F107 of FIG. 25, the management header of the file F1-2, i.e., the contents of the cluster CL(B), is updated. More specifically, the size of the data frame designated in the TOC frame is updated, and the setting of the space frame is changed.

FIG. 26C reveals that the second cluster CL(5) is a cluster including the divide point DP, and the message data of the cluster CL(5) before the divide point DP is unnecessary data. Also, the cluster CL(B) is a copy of the cluster CL(2), and the message data of the data frame located after the space frame in the cluster CL(2) is also unnecessary for the file F1-2.

Thus, the size of the space frame in the TOC frame is changed so that the space frame positioned in the original cluster CL(2) and copied into the cluster CL(B) is expanded to the divide point DP of the cluster CL(5). The size of the data frame in the TOC frame is also changed.

The space frame is expanded across the clusters CL(B) and CL(5) in the file F1-2, and serves as a reproduce protect area. As a result, in the file F1-2, the data portion of the original file F1 after the divide point DP is to be reproduced.

A further description is given below of the dividing operation with reference to FIGS. 29 and 30. As is seen from the foregoing description, in this embodiment, in performing the dividing operation, only the following simple procedure is required. A cluster including a divide point and a cluster including a management header are copied. Then, the management headers (TOC frames) of the divided files are partially updated, and the sizes of the data frame and the space frame are changed. As a result, the original file is divided into two sound data files before and after Ad the divide point. Because of this procedure, the amount of copying and overwriting of data, which is required for a performing an editing operation, such as a dividing operation of a message data file, can be minimized. This makes it possible to enhance the efficiency of the editing operation and to minimize the amount of access required for the editing operation, thereby reducing the processing time and the power consumption to a minimal level.

If the divide point DP is located at the boundary of a cluster, copying of the cluster including the divide point is unnecessary. For example, if the boundary between the cluster CL(5) and the cluster CL(6) of the file F1 is the divide point, the divided file F1-1 is formed of the clusters CL(2) through CL(5), and the divided file F1-2 is formed of the cluster CL(X) which is a duplicate of the cluster CL(2), and the clusters CL(6) through CL(9). In this case, only a copy of the cluster including the management header is required for performing the dividing operation, thereby making operation even simpler and shorter.

In the example of FIGS. 26A, 26B, and 26C, the cluster CL(5) is integrated into the file F1-1, while the cluster CL(A) is integrated into the file F1-2. However, the cluster CL(A) may be integrated into the file F1-1, while the cluster (5) may be integrated into the file F1-2. The same applies to the cluster containing the management header.

In the area which initially stored the original cluster CL(5) and is now used as part of the space frame, i.e., in the first part of the cluster CL(5) of the file F1-2, the sound data may be reserved, or dummy data, such as zero data, may be filled. Alternatively, it may be used as a storage area for storing any type of additional data. The same applies to the area which was made invalid instead of being used as part of the space frame, i.e., the hatched portion shown in FIG. 26B at the second part of the cluster CL(A) of the file F1-1.

Various types of data may be stored in the space frame as discussed above. The message data may remain the same instead of being replaced with a space frame. In this case, when the two divided files are combined to the original frame, the whole clusters can be used as they are, thereby making the processing efficient. If two space frames are located adjacent to each other after performing the dividing operation, they may be combined to a single space frame.

The procedure and the content of the dividing operation are not limited to the above examples, and various modifications may be made.

In the foregoing embodiment, after the cluster including the divide point is duplicated, part of the divided files is formed as a space frame or an invalid portion by updating the TOC frame. Alternatively, however, dummy data may be added to the message data before the divide point so as to form a whole cluster data, which may then be stored in an unused cluster. Dummy data may also be added to the message data after the divide point so as to form a whole cluster data, which may then be stored in an unused cluster. The two clusters may be integrated into cluster links forming the divided files. In this case, the dummy data of the individual clusters may be managed as a space frame or an invalid portion, as in this embodiment.

Although the present invention has been described through this embodiment in the context of the system configuration and the divide editing operation, it is not limited to the above configuration and the operation.

In particular, in this embodiment, a dividing operation of a message data file in a system using a stick-type memory has been discussed. However, other types of files, such as a music data file and a moving-picture data file, may be handled in a system using a stick-type memory. Then, the dividing operation may be similarly performed on the music data file or the moving-picture data file, thereby making the divide editing operation efficient.

The recording medium of the present invention is not restricted to a stick-type memory, such as the one shown in FIGS. 1A through 1D. A solid-state memory medium having another configuration, such as a memory chip, a memory card, a memory module, etc., may be used.

Additionally, modifications may be made to details of the format of the file system used in this embodiment according to the practical use.

Variations of the capacity of the flash memory are not limited to those shown in FIG. 8. The memory device in the recording medium of the present invention may be a memory device other than a flash memory.

As is seen from the foregoing description, the present invention offers the following advantages. Management information for each file stored in a recording medium is also stored in the recording medium. By this management information, the position of main data and reproduce protect areas can be managed. In performing a divide editing operation on a file, unit data, for example, the above-described cluster or block, including a divide point is copied, and the management information of the file to be divided is updated, thereby forming a first file corresponding to the first part of the original file. Management information for the second part of the file is created and is added to the head of a second file, and the first part of the original file before the divide point within the second file is formed as a reproduce protect area, thereby forming the second file. With this arrangement, moving, copying, and overwriting of data, which are required for dividing a file, can be minimized, and the processing time and the power consumption for the editing operation can also be reduced to a minimal level.

What is claimed is:

1. An editing apparatus for dividing a data file including main data and first management data added to the main data, the main data being formed by interconnecting fixed-length recording data blocks, and the first management data being provided for managing a recording position of the main data for managing and a position of invalid data which is not to be reproduced, said editing apparatus comprising:

operation means for specifying a divide position for a predetermined fixed-length recording data block including the main data and for dividing the main data into a first data file and a second data file in accordance with the divide position;

editing means for editing the first management data in order to make a first part of the predetermined fixed-length recording data block including the main data invalid; and generating means for generating second management data in order to make a second part of the predetermined fixed-length recording data block including the main data invalid, and for adding the second management data to the second data file.

2. The editing apparatus according to claim 1, wherein said operation means specifies a recording data block within which the main data is divided.

3. The editing apparatus according to claim 2, wherein the invalid data managed by the first management data comprises at least the main data of the second part of the recording data block divided at the divide position specified by said operation means, and the invalid data managed by the second management data comprises at least the main data of the first part of the recording data block divided at the divide position.

4. The editing apparatus according to claim 1, further comprising:

copying means for copying the predetermined fixed-length recording data block containing the divide position specified by said operation means into data spaces of the data file; and combine-editing means for logically combining a copy of the recording data block into the second data file, wherein the copied recording data blocks are included in the first data file and the second data file.

5. The editing apparatus according to claim 4, wherein blank data is recorded in the first and second parts of the copied recording data blocks in which the invalid data is recorded.

6. The editing apparatus according to claim 1, further comprising management-data copying means for copying the first management data so as to form intermediate management data, wherein the formed intermediate management data is edited to form the second management data.

7. The editing apparatus according to claim 1, further comprising means for combining any plurality of items of invalid data located adjacent to each other after the data file has been divided into a single item of invalid data.

8. The editing apparatus according to claim 1, further comprising loading/unloading means for detachably loading a storage medium for storing said data file, wherein the first data file and the second data file are created in said storage medium.

9. The editing apparatus according to claim 8, wherein said storage medium comprises a non-volatile memory.

10. The editing apparatus according to claim 1, wherein the main data comprises audio data.

11. The editing apparatus according to claim 1, wherein the main data comprises moving-picture data.

12. The editing method for dividing a data file including main data and first management data related to the main data, the main data being formed by interconnecting fixed-length recording data blocks, the first management data being provided for managing a recording position of the main data and for managing a position of invalid data which is not to be reproduced, said editing method comprising:

a specifying step of specifying a divide position for a predetermined fixed-length recording data block including the main data and for dividing the main data into a first data file and a second data file in accordance with the divide position;

an editing step of editing the first management data in order to make a first part of the predetermined fixed-length recording data block including the main data invalid; and a generating step of generating second management data in order to make a second part of the predetermined fixed-length recording data block including the main data invalid, and for adding the second management data to the second data file.

13. The editing method according to claim 12, wherein a recording data block containing the divide position in which the main data is recorded is specified in said specifying step.

14. The editing method according to claim 13, further comprising:

a copying step of copying the recording data block containing the divide position specified by said specifying step into space areas; and a combine-editing step of combining a copy of the recording data block into the second data file, wherein the copied recording data blocks are included in the first data file and the second data file.

15. The editing method according to claim 14, wherein blank data is recorded in the first and second parts of the recording data blocks in which the invalid data is recorded.

16. The editing method according to claim 14, further comprising a management-data copying step of copying the first management data into a data space before editing the first management data, wherein the copied first management data is edited.

17. The editing method according to claim 12, further comprising a combining step of combining any plurality of items of invalid data located adjacent to each other after the data file has been divided into a single item of invalid data.

18. The editing method according to claim 12, wherein said data file stored in a detachable storage medium is divided.

19. The editing method according to claim 12, wherein the main data comprises audio data.

20. An editing method according to claim 12, wherein the main data comprises moving-picture data.

21. The recording medium for use in managing at least one file and for reading or writing the file in units of data lengths, comprising:

a data recording area for recording at least one data file which is formed of at least one item of main data, at least one item of space data for reserving a recording area, and first management data for managing recording positions of the main data and the space data on a storage medium; and a management-data recording area for recording second management data for managing the data file recorded in said data recording area.

22. The recording medium according to claim 21, wherein the main data comprises audio data.

23. The recording medium according to claim 21, wherein the main data is recorded in a compressed format.

24. The recording medium according to claim 23, wherein the data file further comprises compression management information for managing compression information of the main data.

25. The recording medium according to claim 21, wherein a name of the data file managed by said second management data is different from a name of the main data managed by said first management data.

26. The recording medium according to claim 21, wherein the first management data is recordable in the space data.

27. The recording medium according to claim 21, wherein the space data is newly created by dividing the main data.

28. The recording medium according to claim 21, wherein the space data is not read.

29. The recording medium according to claim 21, wherein said recording medium comprises a non-volatile memory.

* * * * *